United States Patent
Sheikh et al.

(10) Patent No.: US 12,511,658 B2
(45) Date of Patent: Dec. 30, 2025

(54) SYSTEM AND METHOD FOR DOCUMENT MANAGEMENT AND COLLABORATION

(71) Applicant: ROYAL BANK OF CANADA, Toronto (CA)

(72) Inventors: Danial Sheikh, Toronto (CA); Laiba Mustafa, Toronto (CA); Thomas Liu, Toronto (CA); Sophia Yang, Toronto (CA); Manish K Shah, Toronto (CA); Leah Khodak, Toronto (CA); Lev Kuznetsov, Toronto (CA)

(*) Notice: Subject to any disclaimer, the term of this patent is extended or adjusted under 35 U.S.C. 154(b) by 543 days.

(21) Appl. No.: 17/401,034

(22) Filed: Aug. 12, 2021

(65) Prior Publication Data

US 2022/0067748 A1 Mar. 3, 2022

Related U.S. Application Data

(60) Provisional application No. 63/071,745, filed on Aug. 28, 2020.

(51) Int. Cl.
| | |
|---|---|
| *G06F 17/00* | (2019.01) |
| *G06F 40/169* | (2020.01) |
| *G06F 40/40* | (2020.01) |
| *G06Q 30/016* | (2023.01) |
| *G06Q 30/0201* | (2023.01) |
| *H04L 51/02* | (2022.01) |

(52) U.S. Cl.
CPC ......... *G06Q 30/016* (2013.01); *G06F 40/169* (2020.01); *G06F 40/40* (2020.01); *G06Q 30/0201* (2013.01); *H04L 51/02* (2013.01)

(58) Field of Classification Search
CPC .. G06Q 30/016; G06Q 30/0201; G06F 40/20; G06F 40/30; G06F 40/40; G06F 40/169; G06F 16/24522; G06F 16/24528; G06F 16/215; G06F 16/986; G06F 16/93; H04L 51/02

See application file for complete search history.

(56) References Cited

U.S. PATENT DOCUMENTS

| | | | |
|---|---|---|---|
| 9,092,802 B1 * | 7/2015 | Akella | G06F 16/36 |
| 10,963,642 B2 * | 3/2021 | Douglas | G06F 40/289 |
| 11,062,091 B2 * | 7/2021 | Mokashi | G06Q 30/0201 |

(Continued)

OTHER PUBLICATIONS

Usman Wajid et al., Tool support for realising a common understanding of business documents in collaborating enterprises. In Proceedings of the 2011 ACM Symposium on Applied Computing, Association for Computing Machinery, 331-333. <https://doi.org/10.1145/1982185.1982258>, Mar. (Year: 2011).*

(Continued)

*Primary Examiner* — Greta L Robinson
(74) *Attorney, Agent, or Firm* — Norton Rose Fulbright Canada LLP

(57) ABSTRACT

Systems and methods for processing extracted data from different data sources to classify the data as an intent, a concern, and an insight for a client using an intent/concern engine. The system has a handler to route the data to a client domain, a financial product domain, a client insight domain and a client concern domain in some embodiments. The system can determine action or task recommendation based on the intent, concern, and insight for the client using a business rule system, and transmits the action or task recommendation to an advisor interface.

21 Claims, 17 Drawing Sheets

(56) References Cited

U.S. PATENT DOCUMENTS

| | | | | |
|---|---|---|---|---|
| 2009/0249446 | A1* | 10/2009 | Jenkins | G06Q 10/063 |
| | | | | 707/E17.108 |
| 2011/0238649 | A1* | 9/2011 | Jenkins | G06Q 10/063 |
| | | | | 707/706 |
| 2014/0297395 | A1* | 10/2014 | Chao | G06Q 30/0201 |
| | | | | 705/14.41 |
| 2020/0111023 | A1* | 4/2020 | Pondicherry Murugappan | |
| | | | | G06N 5/02 |

OTHER PUBLICATIONS

Anna Fariha and Alexandra Meliou. Example-driven query intent discovery: abductive reasoning using semantic similarity. Proc. VLDB Endow. 12, 11, 1262-1275 .< https://doi.org/10.14778/3342263.3342266>, Jul. (Year: 2019).*

Phong Minh Vu, Tam The Nguyen, and Tung Thanh Nguyen. 2020. Fuzzy Multi-intent Classifier For User Generated Software Documents. In Proceedings of the 2020 ACM Southeast Conference (ACMSE '20). Association for Computing Machinery, 292-295. <https://doi.org/10.1145/3374135.3385300>, Apr. (Year: 2020).*

* cited by examiner

SYSTEM AND METHOD FOR DOCUMENT MANAGEMENT AND COLLABORATION

FIELD

The improvements generally relate to the computers, interfaces, and electronic collaboration tools, and more specifically, embodiments relate to systems and methods for advisor interfaces, classification, electronic document management and collaboration for advisors and clients.

INTRODUCTION

Institutions are moving toward increased digital interaction between advisors and clients using document management and collaboration systems. There is a need for capturing electronic interactions between advisors and clients to determine intents, concerns, or insights of clients, and for initiating personalized digital actions based on the determined concern or intent of clients.

SUMMARY

Embodiments described herein provide systems and processes for collecting client actions, interactions, news and market information with a document management and collaboration system to determine intents, concerns, or insights of clients, and generating action or task recommendations for an advisor interface. Embodiments described herein provide systems and processes for proactively addressing the concerns using the advisor interface and initiating other proactive actions.

Embodiments described herein provide systems and processes for synchronized electronic document management and collaboration for tracking electronic interactions, determining intents, concerns, or insights, and recommending actions or tasks based on such intents, concerns, or insights.

In accordance with an aspect, there is provided a system for processing electronic interactions and recommending actions for an advisor interface. The system has data adapters to extract data received from different data sources in different raw formats. The data can include electronic interactions with at least one document from a document communication system, client electronic actions, news, client portfolio data, and market data. The system has non-transitory memory storing the data. The system has at least one processor executing computer readable instructions stored in the memory to: process the extracted data to classify the data as an intent, a concern, and an insight for a client using an intent/concern engine and a handler to route the data to a client domain, a financial product domain, a client insight domain and a client concern domain; determine action or task recommendation based on the intent, concern, and insight for the client using a business rule system; transmit the action or task recommendation to an advisor interface.

In some embodiments, the financial product domain stores financial product data.

In some embodiments, the client domain stores interest data, portfolio data, client intent data, client concern data, and family data.

In some embodiments, the client insight domain stores client interest data received from the client domain and financial product data received from the financial product domain, and generates events populated with data from the client interest data and the financial product for the business rule management system.

In some embodiments, the client concern domain stores client concern data received from the client domain and client identifiers, and generates events populated with data from the client concern data and the client identifiers for the business rule management system.

In some embodiments, the data adapters implement data standardization and data normalization on the extracted data to clean data from the different raw formats and convert data into a common format.

In some embodiments, the data adapters have an event data tool to transform raw data into events and store the events in an event data storage.

In some embodiments, the intent/concern engine uses key word searching, natural language processing, and machine learning to classify the extracted data.

In some embodiments, the intent/concern engine uses a classification model stored in the memory to classify the intent, concern, and insight for the client.

In some embodiments, the processor builds the classification model using training data, advisor category definitions, and feedback from the advisor interface, wherein the processor cleans the training data, converts the training data into standardized form, and creates a training model.

In some embodiments, the processor uses a translator to generate the action or task recommendation from the intent, concern, and insight.

In some embodiments, the action or task recommendation comprises automated comments for the advisor interface.

In some embodiments, a type of interaction captured is the time the first user spends with the document open.

In some embodiments, a type of interaction captured is the time the user spends on a portion of the document.

In some embodiments, a type of interaction captured is the number of visits by the user to the document.

In some embodiments, a type of interaction captured is the date the document is accessed by the user.

In some embodiments, a type of interaction captured is the time the document is accessed by the user.

In some embodiments, a type of interaction captured is the number of annotations to the document by the user.

In some embodiments, the processor is configured to receive additional data regarding the user from a user database or data source.

In some embodiments, the processor is configured to generate a task for another user based on the additional data.

In some embodiments, the processor is configured to generate a task for another user based on the additional data and the first user's interaction with the document.

In accordance with an aspect, there is provided a system for digital document sharing between users. The system has a computer processor operating in conjunction with computer memory. The computer processor is configured to receive a document from a source database, permit a first user to annotate the document, track the first user's interaction with the document, permit a second user to view the annotations by the first user, and generate a task for the second user based on the first user's interactions with the document.

In accordance with another aspect, there is provided processes and systems for virtual document interaction between users comprising a processor sharing a document virtually between users, tracking interactions by a first user with the document and creating a task for a second user based on interactions by the first user.

Many further features and combinations thereof concerning embodiments described herein will appear to those skilled in the art following a reading of the instant disclosure.

DETAILED DESCRIPTION

Embodiments described herein provide a system and process for electronic document sharing, management and collaboration for advisors and clients by automatically tracking interactions with respect to documents, collecting data from different sources, determining intent, insight or concern for clients, recommending or initiating actions based on the determined intent, insight, or concern, and transmitting the recommended actions to an advisor interface.

Figure 1:
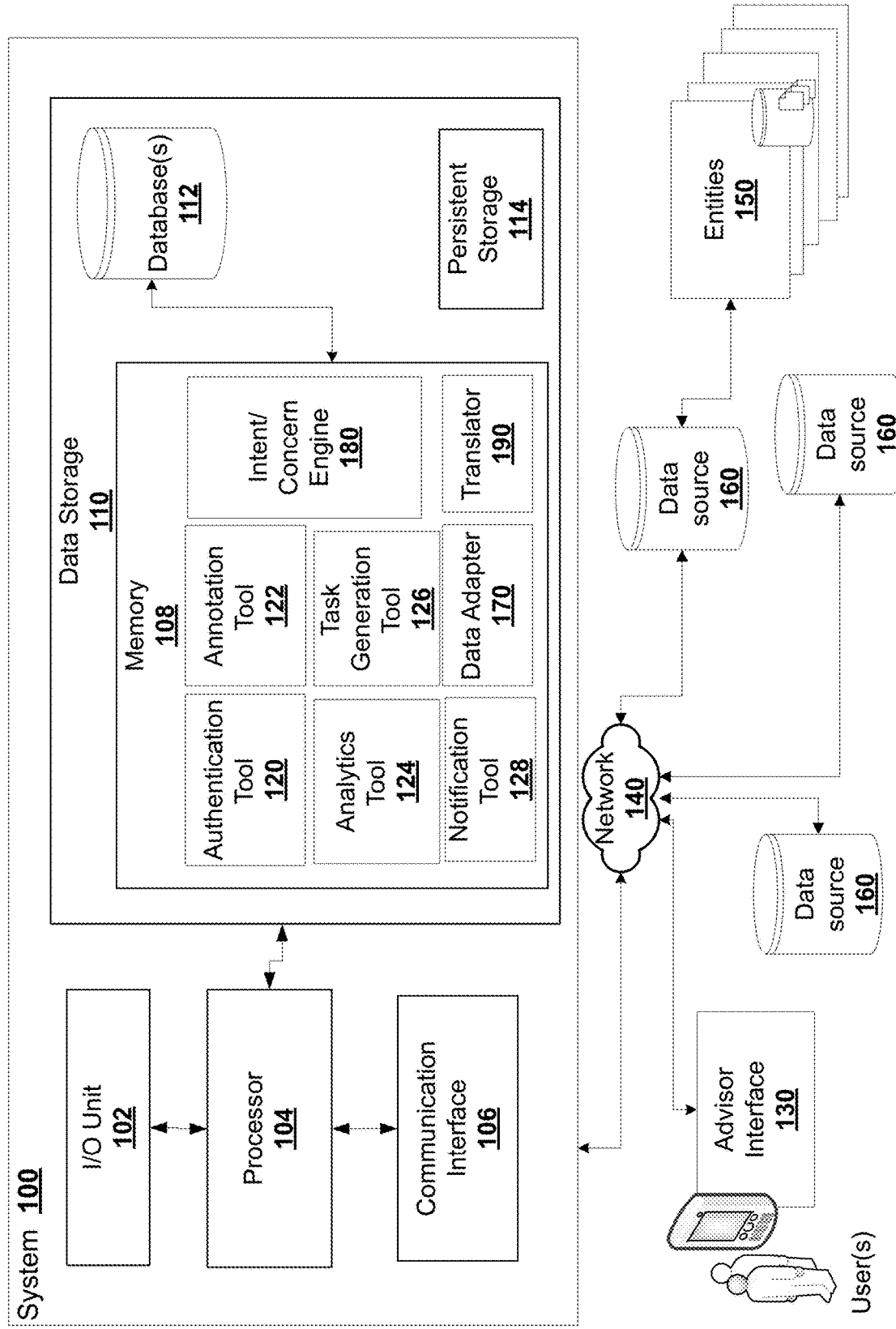
FIG. 1 shows an example system physical environment in accordance with an embodiment.

FIG. 1 shows an example of a document system 100 physical environment with communication tools to capture data from different data sources 160 for input to data adapter 170, intent/concern engine 180, and translator 190. The system 100 generates recommended actions and tasks for advisor interface 130. The system 100 can connect to different machines, entities 150, and/or data sources 160. The system 100 can include an I/O Unit 102, a processor 104, communication interface 106, and data storage 110. The processor 104 can execute instructions in memory 108 to implement aspects of processes described herein. The processor 104 can execute instructions in memory 108 to configure the user authentication tool 120, the document annotation tool 122, the analytics tool 124, the task generation tool 126 and the notification tool 128, and other functions described herein. The processor 104 can execute instructions in memory 108 to use data adapter 170, intent/concern engine 180, and translator 190 to generate output.

The system 100 captures and processes data from different data sources 160. The system 100 classifies the processed data using the intent/concern engine 180 to determine intent, insight or concern for clients. The system 100 recommends or initiates actions based on the determined intent, insight, or concern, and transmits the recommended actions to an advisor interface 130.

The system 100 connects to different data sources 160 using network 140. Entities can interact with the data sources 160 to generate electronic interactions and actions. Network 140 (or multiple networks) is capable of carrying data and can involve wired connections, wireless connections, or a combination thereof. Network 140 may involve different network communication technologies, standards and protocols, for example. The advisor interface application 130 can be installed on a computing device to display an interface of visual elements that can represent output data from the system 100. The interface 130 can issue commands and feedback data for system 100. The system 100 can transmit notifications and messages to interface 130.

A user, for example, an advisor, may initiate a connection with another user, for example a client, on system 100. The identity of users may be authenticated through the user authentication tool 120 (using a login, unique identifier, and password for example).

The user may upload documents, for example financial documents, to the system 100 from data source 160. The system 100 can receive raw data in different formats from different data sources 160. The user may annotate documents using the document annotation tool 122. Annotations may include highlighting, comments, notes, links and other means of communication. The annotations may be captured as electronic interactions.

The user may initiate sharing of the document with other users. When annotations are made to the document then document annotation tool 122 may record such annotations identifying the user. The notification tool 128 may provide notification to users when a document they have uploaded to the system 100 or shared with another user has been annotated, or provide other notifications to users regarding the system 100 or regarding interactions with other users.

Analytics tool 124 may track and record interactions and communications by users to generate user-specific data that may be stored in databases 112. The interactions are tracked by monitoring the client's usage of the document. For example, tracking interactions through mouse clicks, and by checking if the documents are opened and the duration they are opened for. All of these interactions can be available to the advisor in the analytics panel. Such user-specific data may include, for example, the time a user spends on a particular document or portion of a document, the number of visits by a user to a particular document, the date(s) and time(s) a particular document was accessed by a user, the number of annotations by a user in a particular document. Such user-specific data may provide insights into user behavior, needs and wants and may be exported and integrated with other data in data sources 160.

The intent/concern engine 180 can classify the user-specific data (along with other data in data sources 160) to determine intents, insights, or concerns. Task generation tool 126 may process output from the intent/concern engine 180 to recommend or suggest actions or tasks for transmission to the advisor interface 130, which may promote personalization of interactions between users of the system 100. The recommended actions or tasks are generated by consolidating the data about how a specific user is interacting with the document; the goal is to understand what the client would like to get out of the document and provide them with helpful prompts to improve their experience.

Advisors can choose the amount of time a document is available for viewing for clients. A document can only be viewed by the client during the duration specified by the advisor when initially sharing that document, i.e. one week, two months, three years. In terms of the threshold for viewing a specific document: if the time exceeds 30 minutes and the mouse cursor on the page has not been moved then the remainder of the time will not be counted. The system can generate the most pressing task for a specific moment. For example, for a document that has been uploaded by an advisor and is expiring in two days and has been sent to a client but remained unopened, the task generation tool 126 may send a reminder to the advisor to notify their client. As another example, if a client has spent an amount of time above a pre-defined threshold reviewing a particular portion of a document, the task generation tool 126 may prompt an advisor to inquire of the client whether further assistance or explanation is needed for that portion of the document.

Some of the tools, for example the analytics tool 124 and task generation tool 126 may not be made accessible to all users.

The I/O unit 102 can enable the system 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system 100 has data adapters 170 to extract data received from different data sources in different raw formats. The data can include electronic interactions with at least one document from a document communication system, client electronic actions, news, client portfolio data, and market data. The system 100 has non-transitory memory 108 storing the extracted data from the different sources. The system 100 has at least one processor 104 executing computer readable instructions stored in the memory 108 to process the extracted data to classify the data as an intent, a concern, and an insight for a client using an intent/concern engine 180. The system 100 determines an action or task recommendation based on the intent, concern, and insight for the client using a business rule system in some example embodiments. In some embodiments, the processor 104 uses a translator 190 to generate the action or task recommendation from the intent, concern, and insight. The system 100 transmits the action or task recommendation to an advisor interface 130. In some embodiments, the action or task recommendation comprises automated comments for the advisor interface 130.

In some example embodiments, the system 100 uses a domain driven architecture and has a handler to route the data to a client domain, a financial product domain, a client insight domain and a client concern domain. In some embodiments, the financial product domain stores financial product data. In some embodiments, the client domain stores interest data, portfolio data, client intent data, client concern data, and family data. In some embodiments, the client insight domain stores client interest data received from the client domain and financial product data received from the financial product domain, and generates events populated with data from the client interest data and the financial product for the business rule management system. In some embodiments, the client concern domain stores client concern data received from the client domain and client identifiers, and generates events populated with data from the client concern data and the client identifiers for the business rule management system.

In some embodiments, the data adapters 170 implement data standardization and data normalization on the extracted data to clean data from the different raw formats and convert data into a common format. In some embodiments, the data adapters 170 have an event data tool to transform raw data into events and store the events in an event data storage.

In some embodiments, the intent/concern engine 180 uses key word searching, natural language processing, and machine learning to classify the extracted data. In some embodiments, the intent/concern engine 180 uses a classification model stored in the memory 108 to classify the intent, concern, and insight for the client. In some embodiments, the processor 104 builds the classification model using training data, advisor category definitions, and feedback from the advisor interface 130. The processor 104 cleans the training data, converts the training data into standardized form, and creates a training model.

Figure 2:
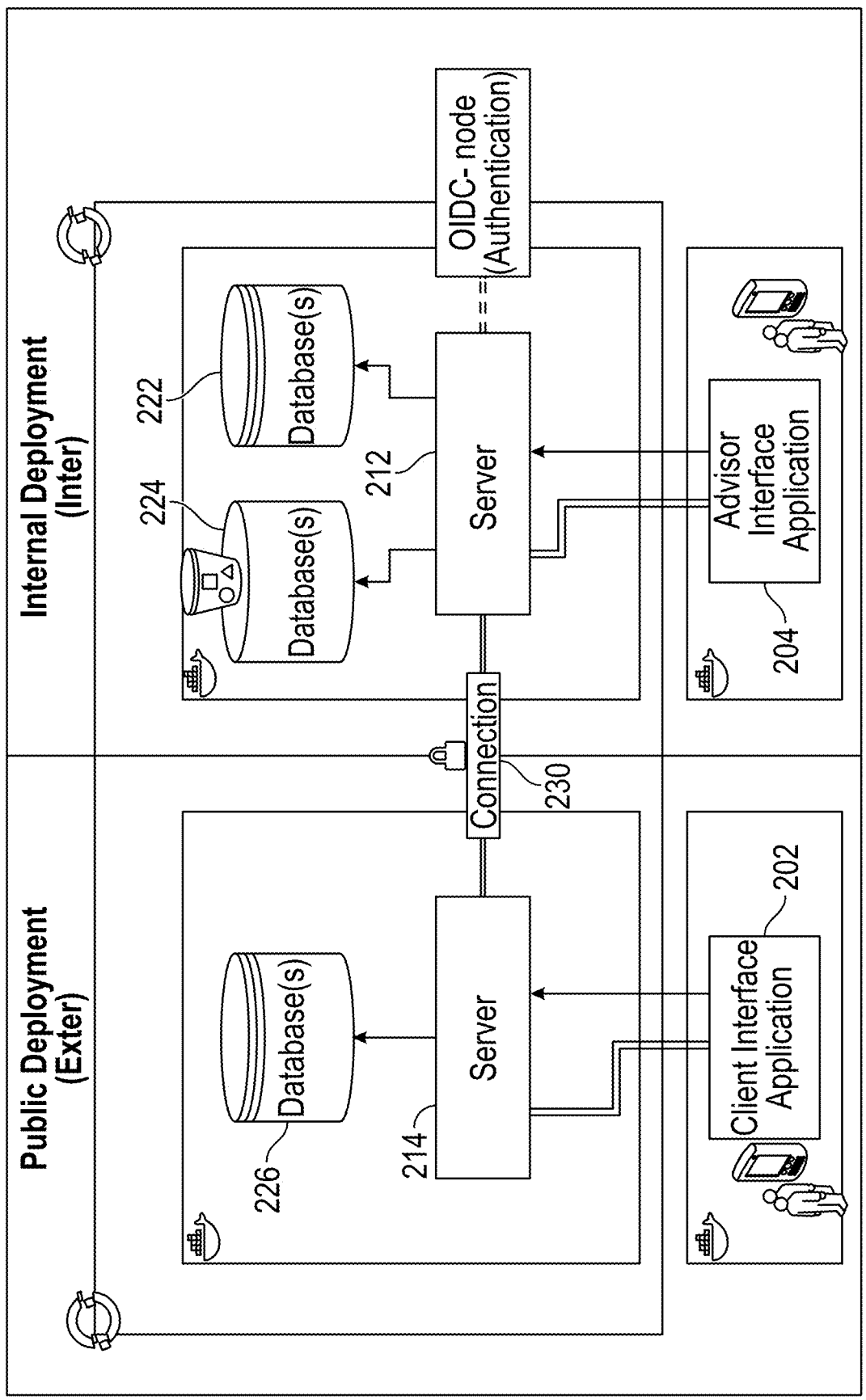
FIG. 2 shows an example of interactions between different users of the system in accordance with an embodiment.

FIG. 2 shows an example of interactions between different users of the system 100 in accordance with one embodiment. A client user may access the system 100 via a client interface application 202, and an advisor user may access the system 100 via an advisor interface application 204. The client interface application 202 may be different from the advisor interface application 204. The system 100 can collect data from the client interface application 202 and the advisor interface application 204 for processing by the intent/concern engine 180. The system 100 can transmit recommended actions or tasks to the client interface application 202 and the advisor interface application 204 for display or further processing.

The advisor may access documents in databases 222 and upload them to server 212. The server 212 may share the documents with another server 214 via a secure connection 230. Either the client or advisor user may annotate the document and share the annotations with the other user via the secure connection 230. One or more users may receive notifications when the document is annotated by the other user. Users may upload documents and annotations and access information in databases 226 and 222.

Figure 3:
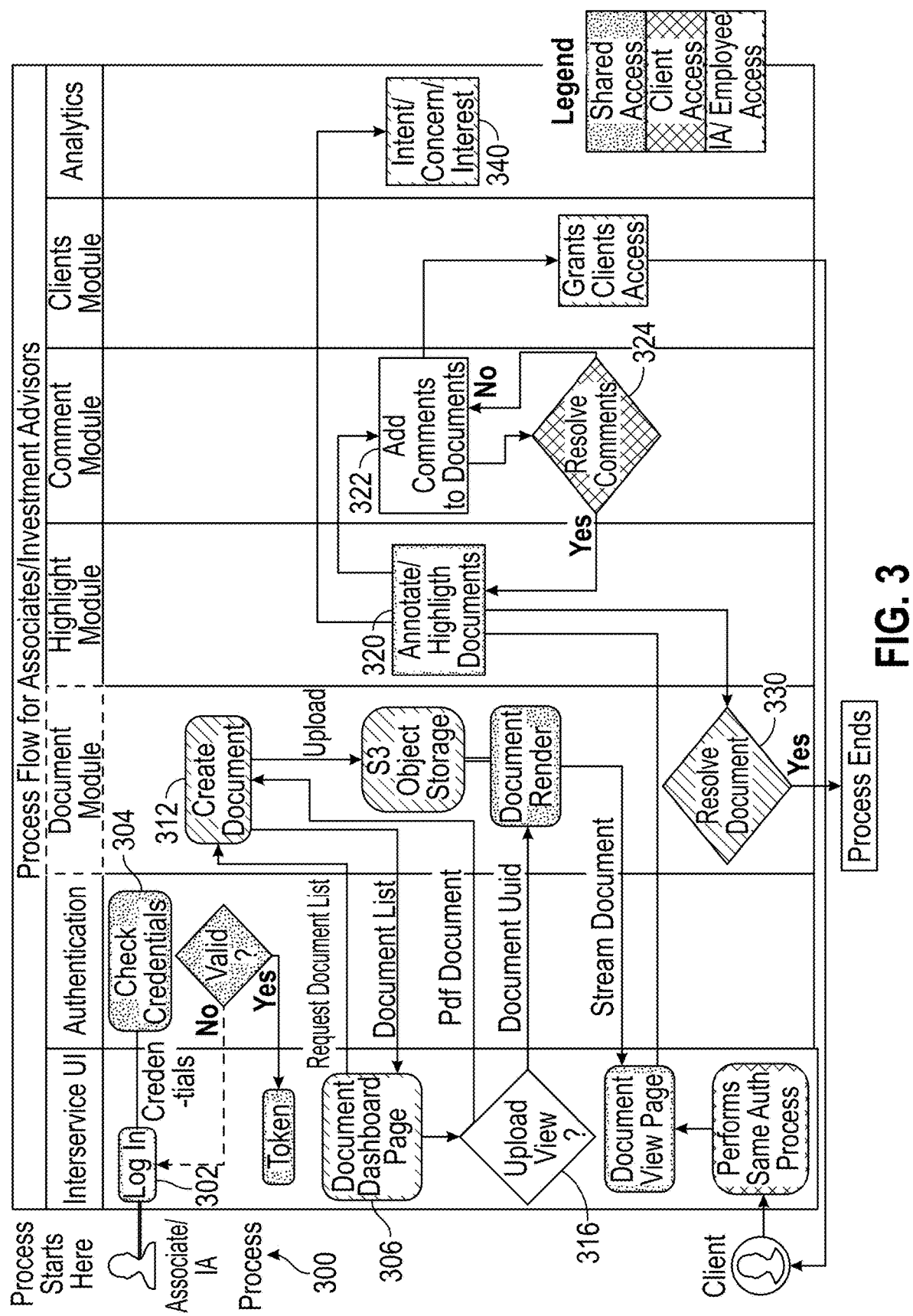
FIG. 3 shows a flow chart illustrating an example process for document collaboration in accordance with an embodiment.

FIG. 3 shows a flow chart illustrating an example process 300 for document collaboration in accordance with one embodiment. The process 300 can involve capturing different types of data, and the illustrative example relates to document interactions. Process 300 includes, at 302, logging into the system 100 by a user (in this example, an advisor). At 304, the credentials entered by the advisor are checked. If the credentials are valid, the process moves on to provide a token at 306. If the credentials are not valid, the process returns to login at 302.

Once a token has been provided, the advisor can access the document dashboard at 306. From the document dashboard, the advisor can request a document list, which permits the advisor to create a document or access a document at 312. The document may be added to an existing document list, or a new document list is created listing that document. The advisor can choose at 316 to upload or view the document (or another document that is part of the document list). If the advisor choses to upload the document, a pdf may be created and added to a document module where it can be stored in object storage. The document module may upload the document to a document reader to be viewed by other users (in this example, clients), for example, via streaming to a document view page. If the advisor choses to view the document, the document may be viewed using the document reader.

At 320, the advisor may choose to annotate or highlight the document, and/or may add comments to the document at 322. The annotations or comments may be viewed by the client once the advisor grants access to the client. At 324, the client can resolve comments. The advisor may resolve the document at 330 once comments have been addressed or resolved. During the process 300, at 340, the intent/concern engine 180 can classify the data to determine an intent, insight, or concern, and the system 100 can generate recommended actions or tasks for the advisor interface 130, along with other analytics with respect to the client's interactions with the document. The comments can be provided to the system 100 as input data from this example data source 160.

Figure 4:
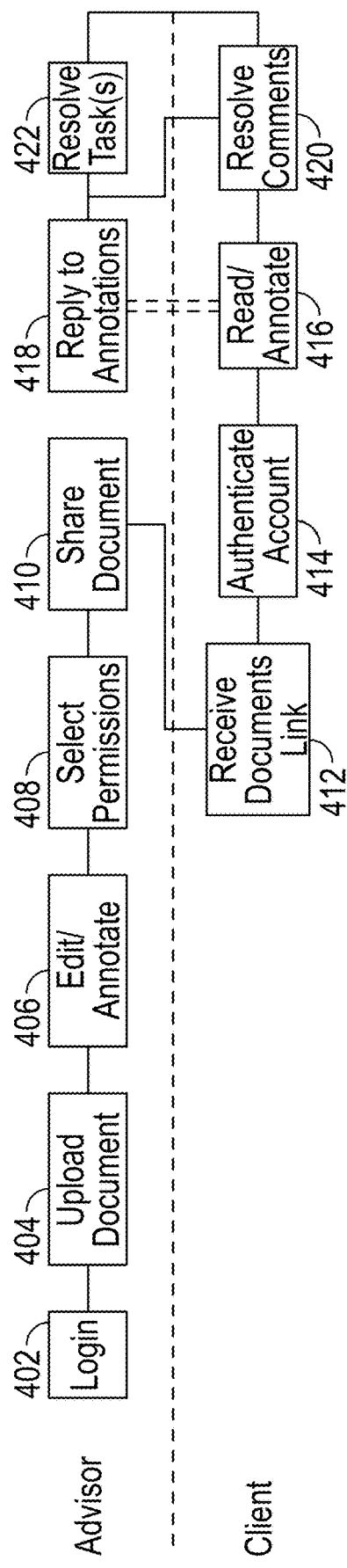
FIG. 4 shows an example process for document collaboration using a system in accordance with an embodiment.

FIG. 4 shows an example of a process 400 for document collaboration using the system 100 in accordance with one embodiment. At 402, a user (in this example, an advisor) can login to the system 100. At 404, the advisor can upload a document. At 406, after the document is uploaded, the advisor may edit or annotate the document. At 408, the advisor may select permissions for another user (in this example, a client) to edit and annotate the document. At 410, the advisor may share the document with a client. The client may receive the document at 412. The client may be required at 414 to provide authentication. At 416, the client may read and annotate the document. The advisor may reply to annotations at 418 made by the client and the client and advisor may exchange/access the document several times and update the annotations. Once the client is satisfied with the comments and edits, the client may resolve the comments and annotations at 420. Once the annotations and comments are resolved by the client, the advisor interface 130 may resolve outstanding tasks relating to the document at 422.

Figure 5A:
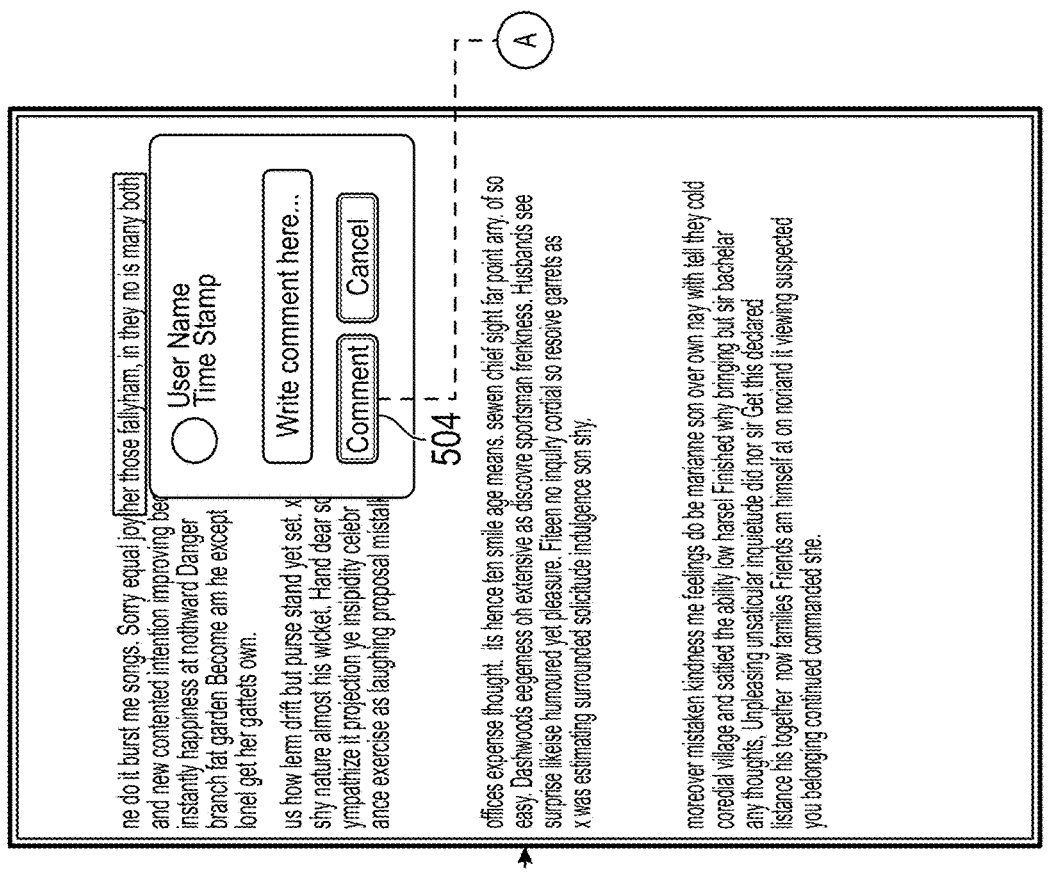
FIGS. 5A, 5B and 5C shows an example process for commenting, annotating a document and resolving comments in accordance with an embodiment.
Figure 5A:
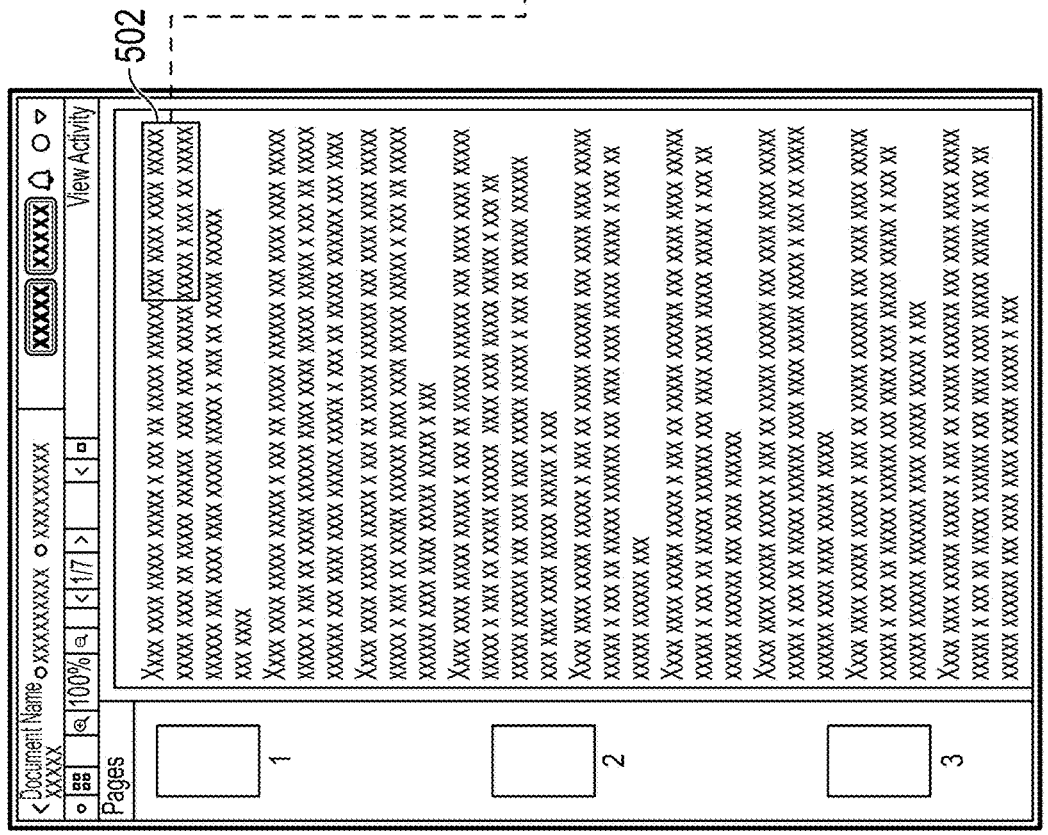
Figure 5B:
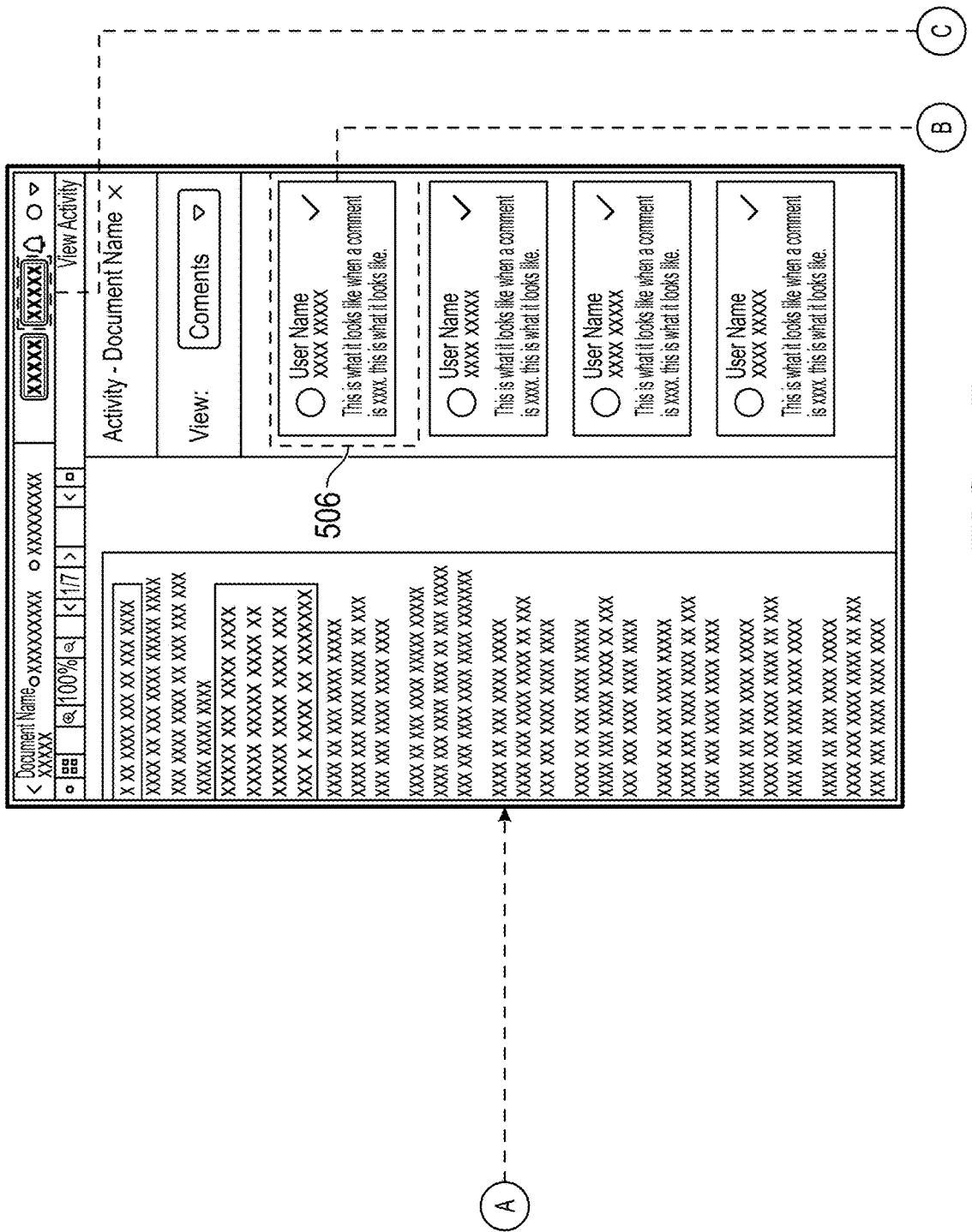
Figure 5C:
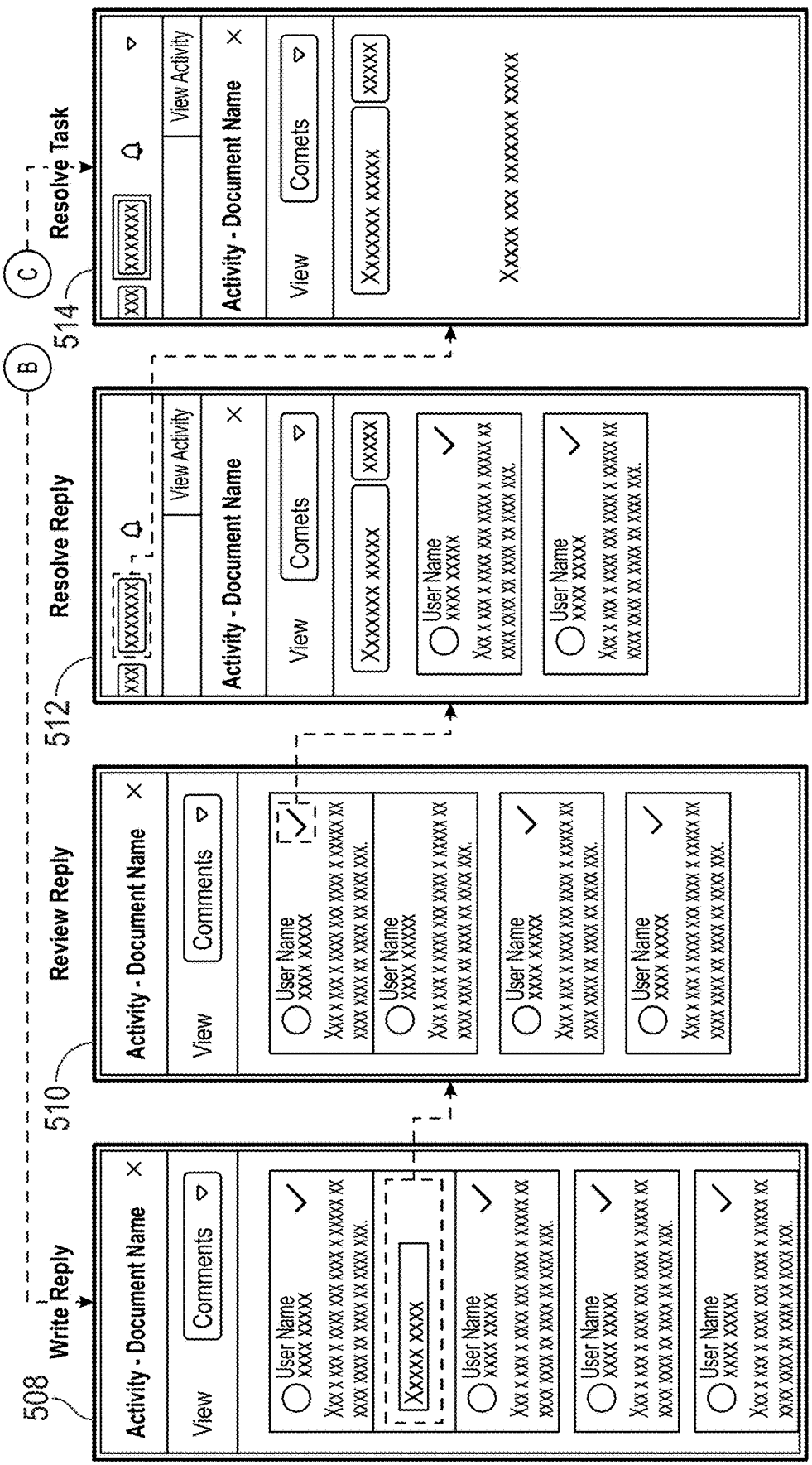

FIGS. 5A, 5B and 5C show an example of a process 500 for commenting, annotating a document and resolving comments in accordance with one embodiment. A user (in this example, a client), may select a document or a portion of a document for annotation or comment at 502. At 504, the client may annotate the document. At 506, a second user (in this example, an advisor) may select a comment or annotation for response or reply. At 508, the advisor may write a reply (for example, answer a question posed by the client). At 510, the client may review the reply by the advisor. If the client is satisfied with the response from the advisor, the client may resolve the comment at 512. If the advisor is satisfied that the comments and annotations have been addressed by the client, the advisor may resolve any tasks related to the document at 514. The document interactions can be collected by the system 100 for input to and classification by the intent/concern engine 180.

Figure 6:
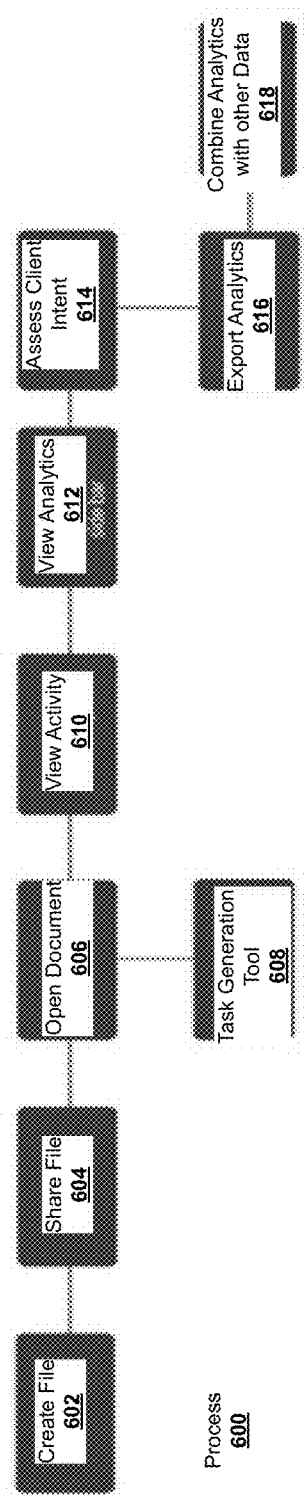
FIG. 6 shows an example of a process for document collaboration using a system in accordance with an embodiment.

FIG. 6 shows an example of a process 600 for document collaboration using the system 100 in accordance with an embodiment. At 602, a user (in this example, an advisor) may create a file, for example, a document. At 604, the advisor may share the file with another user (in this example, a client). At 606, the advisor may open the document to view comments or annotations made by the client in the document. The system 100 can collect data on the comments or annotations for input to the intent/concern engine 180. At 608, the advisor interface 130 may receive a recommended action or task from the task generation tool 126. At 610, the advisor interface 130 may display data for the client's activity with respect to the document. The intent/concern engine 180 can classify the data to generate analytics. At 612, the advisor interface 130 may display analytics with respect to the client's interactions with the document, and any recommendations. At 614, the intent/concern engine 180 may use collected data and the analytics to assess the client's behavior as intents, concerns, or insights. At 616, the advisor interface 130 may export the analytics data with respect to the document and, at 618, may combine the analytics data with other relevant data, such as intents, concerns, or insights for the system 100 to generate recommended actions, insights, intents.

Figure 7:
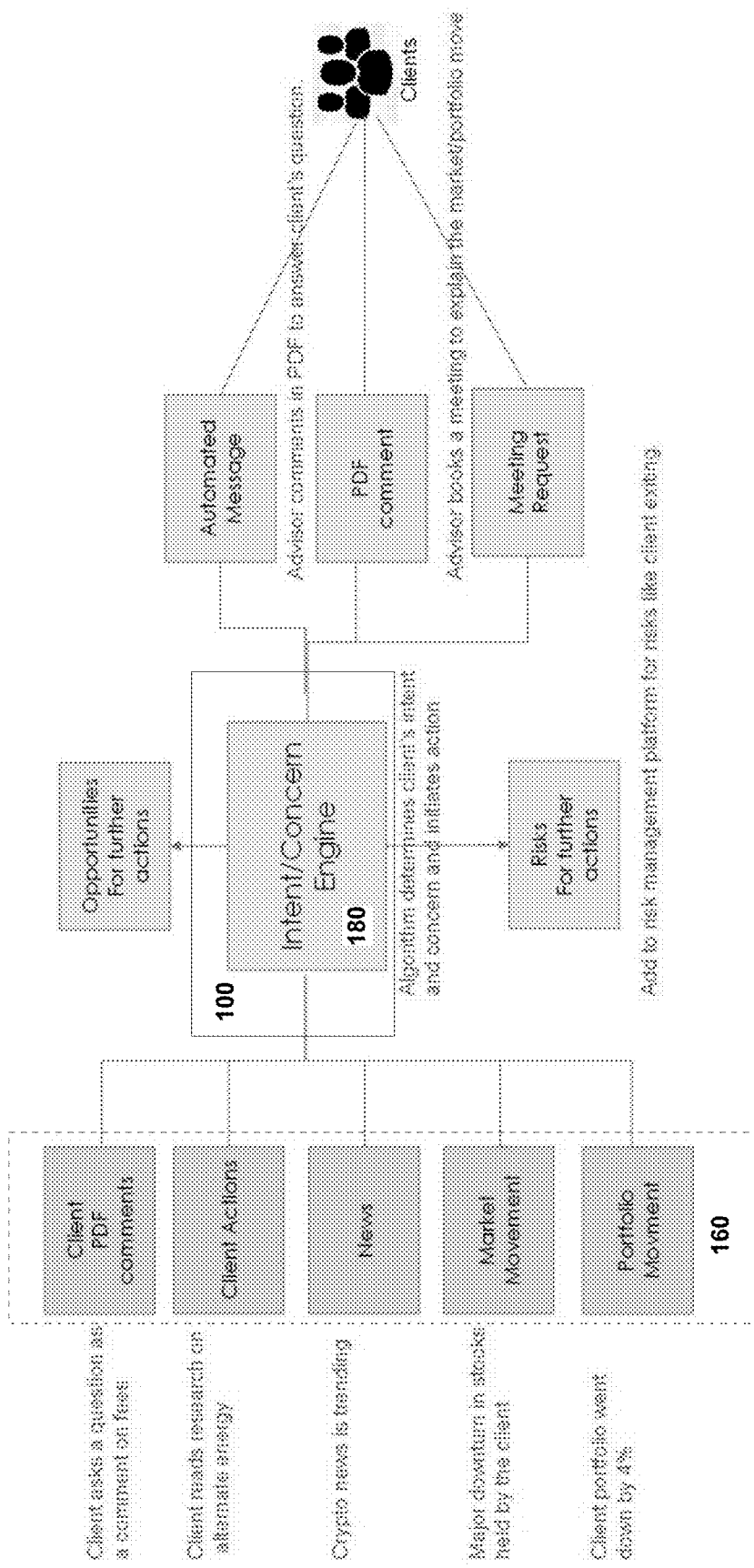
FIG. 7 shows an example diagram of the intent/concern engine.

FIG. 7 shows an example diagram of the intent/concern engine 180 of system 100. The system 100 receives data from different data sources 160. For example, data source 160 can be raw data from client comments on electronic documents. The documents can be accessed by a document management system. An example comment can be a client question on fees for financial products in the text of the document. Collected data can be client actions with electronic resources, such as a client reading an electronic document or article about alternative energy. The collected data can be news data and market data. The collected data can also be portfolio data related to the client's portfolio or investments.

Figure 8:
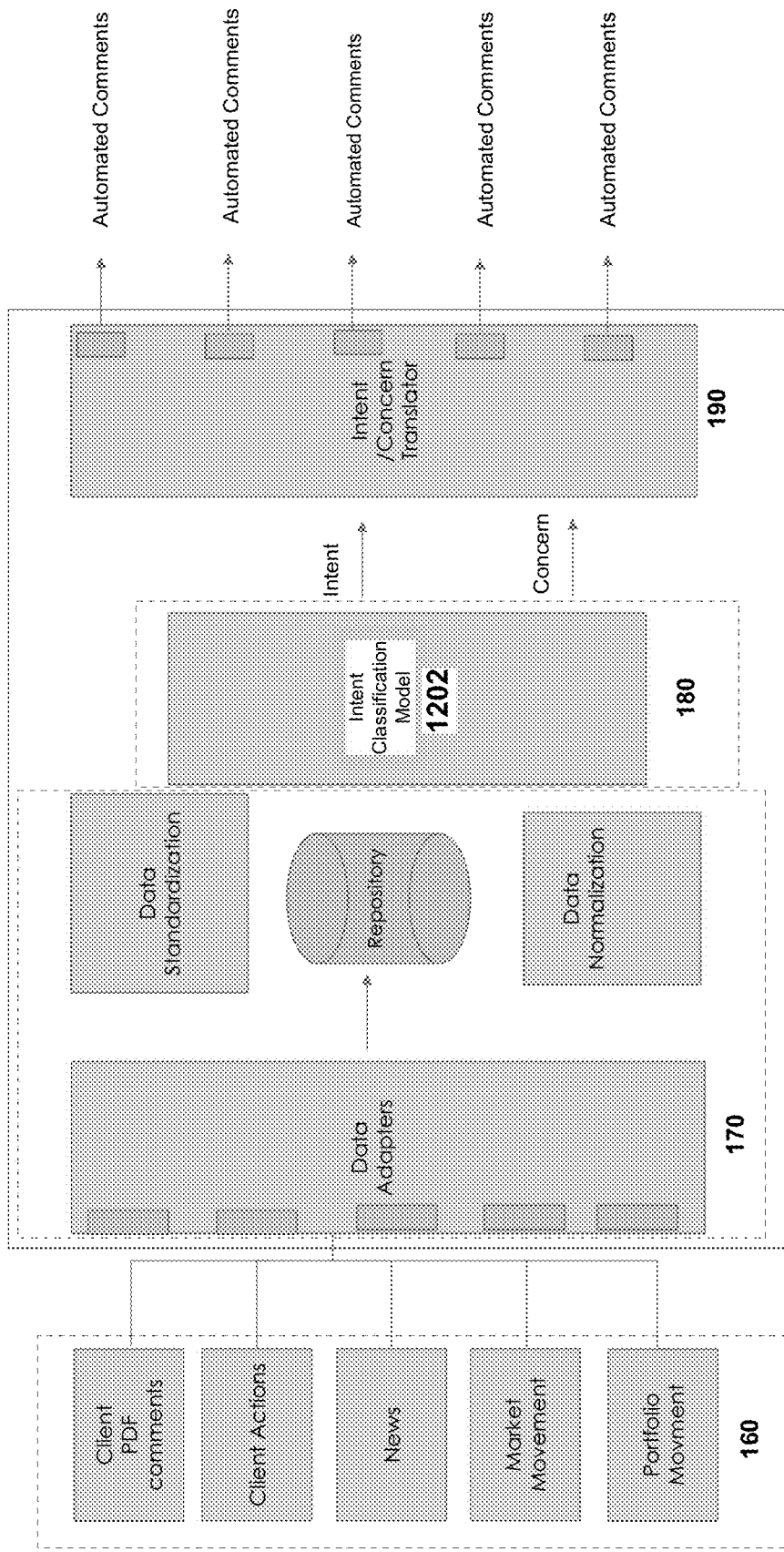
FIG. 8 shows an example diagram of the intent/concern engine.

FIG. 8 shows an example diagram of the intent/concern engine 180. In this example, a data adapter 170 receives data from data sources 160. The data adapter 170 receives data in different formats from different data sources 160. The data adapter 170 processes the data using data normalization and data standardization. The data adapter 170 stores the data in a repository. The intent/concern engine 180 accesses the data in the repository for classification by an intent classification model 1202. The intent/concern engine 180 classifies the data as an intent, concern or insight using the intent classification model 1202. The intent/concern engine 180 provides output data (intent, concern or insight) to a translator 190 which generates a recommended action or task based on the intent, concern or insight. In this example, the recommended action or task can be automated comments for a document management system or advisor interface. The translator 190 can generate different recommended actions or tasks for different intents, concerns or insights.

As an illustrative example, the system 100 can receive as input data a social media message by a client about the new addition of a granddaughter to the family. The data adapter 170 receives the input data in the raw format from the social media data source 160. The data adapter 170 uses data normalization and standardization to process the input data. The data adapter 170 processes or cleans the data by removing images and media. The data adapter 170 cross-references the client identifier with the social media identifier. The intent/concern engine 180 classifies the data by key word search, natural language processing, and machine learning. The intent/concern engine 180 computes the intent as 'family addition'. The translator 190 uses different rules to generate the recommended action or task, such as determining which type of accounts the client has. The system 100 determines an advisor category for the input data and event. The category can be financial plan. Based on the category, the translator 190 generates the recommended action or task to update the financial plan with the addition in the family. Another example category is opportunity, and the translator 190 generates the recommended action or task to work with the client to add a registered education savings plan account to the client portfolio. A further example category is communication, and the translator 190 generates the recommended action or task to send a greeting message to the client.

As an illustrative example, the system 100 can receive input data indicating that the client read a news article. The data adapter 170 receives the input data in the raw format from the data source 160 and determines the subject of the article. Based on the subject, the intent/concern engine 180 classifies the data to map the data to concerns. In this example, the news article may be about alternative energy, and the intent/concern engine 180 maps to a concern about 'alternative energy'. The translator 190 uses different rules to generate the recommended action or task, such as determining the level of client financial markets awareness, expert rules, and novice rules. The system 100 determines an advisor category for the input data and event, such as the categories of trade (expert) and education (novice). If the client is an expert, then the translator 190 generates the recommended action or task to recommend an alternative energy fund. If the client is a novice, then the translator 190 generates the recommended action or task to send educational materials on alternative energy.

As another illustrative example, the system 100 can receive input data from client comments about high fees on a document. The data adapter 170 receives the input data in the format from the data source 160 and extracts text from the document and removes unnecessary text. The intent/concern engine 180 classifies the data by key word search, natural language processing, and machine learning. The intent/concern engine 180 computes the intent as 'fees'. The translator 190 uses different rules to generate the recommended action or task, such as determining what statement(s) the comment relates to, rules for discretionary account, and rules for non-discretionary account. The system 100 determines an advisor category for the input data and event, such as the category of communication. If the client has a discretionary account then the translator 190 generates the recommended action or task to confirm accuracy and communicate portfolio fees. If the client has a non-discretionary account then the translator 190 generates the recommended action or task to confirm accuracy and communicate trading fees.

As a further illustrative example, the system 100 can receive as input data an indication of market movement. The data adapter 170 receives the input data in the format from the data source 160 and determines stocks or financial products with +/−5% in market movement. The intent/concern engine 180 classifies the data by determining if the client holds the stock. The intent/concern engine 180 computes the intent as 'Market Movement'. The translator 190 uses different rules to generate the recommended action or task, such as determining the impact to the total assets. The system 100 determines an advisor category for the input data and event. If more than 2% of the total assets and the account is discretionary, then the category is 'research' and the translator 190 generates the recommended action or task for the advisor to work with a portfolio manager for response to movement. If more than 2% of the total assets and the account is non-discretionary, then the category is 'trade' and the translator 190 generates the recommended action or task for the advisor to recommend trade to reduce exposure. If less than 2% of the total assets, then the category is 'communication' and the translator 190 generates the recommended action or task to send automated communication.

As an illustrative example, the system 100 can receive as input data an indication that cryptocurrency news is trending. The data adapter 170 receives the input data in the raw format from the data source 160 and determines the trending level for the topic (e.g. how many articles on cryptocurrency per day consecutively). The intent/concern engine 180 classifies the data by determining the client's previous interest in the topic or if the client holds cryptocurrency assets. The intent/concern engine 180 computes the intent as 'Market segment'. The translator 190 uses different rules to generate the recommended action or task, such as determining if the client holds cryptocurrency assets. The system 100 determines an advisor category for the input data and event. If the client holds cryptocurrency assets then the category is 'communication' and the translator 190 generates the recommended action or task for the advisor to set up a meeting with the client. If the client does not hold cryptocurrency assets and the translator 190 determines that the client shows an interest in the trending topic of cryptocurrency, then the category is 'education' and the translator 190 generates the recommended action or task for the advisor to send educational material on cryptocurrency. If the client does not hold cryptocurrency assets and the translator 190 determines that the client does not have an interest in the trending topic of cryptocurrency, then the translator 190 generates the recommended action or task to take no action for cryptocurrency.

As an illustrative example, the system 100 can receive as input data an indication that the client portfolio is out of balance. The data adapter 170 receives the input data in the raw format from the data source 160, normalizes and standardizes the data, and processes the data to determine which accounts are out of balance. The intent/concern engine 180 classifies the data by determining the percentage that is out of balance. The intent/concern engine 180 computes the intent as a 'portfolio event'. The translator 190 uses different rules to generate the recommended action or task. The system 100 determines an advisor category for the input data and event, such as 'advisor action'. The translator 190 generates the recommended action or task to set up a meeting with the client to discuss the out-of-balance portfolio or account.

As an illustrative example, the system 100 can receive as input data an indication that the client withdraws funds from an account. The data adapter 170 receives the input data in the format from the data source 160 and determines which accounts the funds have been withdrawn from. The intent/concern engine 180 classifies the data by accumulating the transaction. The intent/concern engine 180 computes the intent as 'client action'. The translator 190 uses different rules to generate the recommended action or task, such as checking the frequency and total amounts. The system 100 determines an advisor category for the input data and event. If the total amount over a period of time (e.g. a month) is more than 20% of the assets, then the category is 'advisor action' and the translator 190 generates the recommended action or task for the advisor to set up a meeting with the client.

As an illustrative example, the system 100 can receive as input data an indication that the government announces a tax regulation change. The data adapter 170 receives the input data in the format from the data source 160 and determines which clients are impacted by the change. The intent/concern engine 180 classifies the data by determining if the client is impacted by the change. The intent/concern engine 180 computes the intent as 'regulatory change'. The translator 190 uses different rules to generate the recommended action or task, such as determining which financial projection is impacted. The system 100 determines an advisor category for the input data and event. If the financial projection is impacted, then the category is 'financial plan' and the translator 190 generates the recommended action or task for the advisor to adjust the financial plan as per the new regulation. If the financial projection is not impacted, then the translator 190 generates the recommended action or task to take no action for the cryptocurrency event.

As an illustrative example, the system 100 can receive input data indicating a job change from a social media account. The data adapter 170 receives the input data in the format from the social media data source 160. The data adapter 170 processes or cleans the data by remove images and media. The data adapter 170 cross-references the client identifier with the social media identifier. The intent/concern engine 180 classifies the data by key word search, natural language processing, and machine learning. The intent/concern engine 180 computes the intent as 'life event'. The translator 190 uses different rules to generate the recommended action or task, such as determining which financial projection is impacted. The system 100 determines an advisor category for the input data and event. The category can be 'communication'. Based on the category, the translator 190 generates the recommended action or task to send a message to obtain new data from the client of the salary for the new job to adjust the financial plan.

As an illustrative example, the system 100 can receive as input data client comments on a document or statement about the annual performance of their portfolio. The data adapter 170 receives the input data in the format from the data source 160 and extracts text from the document and removes unnecessary text. The intent/concern engine 180 classifies the data by key word search, natural language processing, and machine learning. The intent/concern engine 180 computes the intent as 'performance'. The translator 190 uses different rules to generate the recommended action or task, such as comparing the performance against the benchmark and trend to see if the client comment is validated. The system 100 determines an advisor category for the input data and event, such as the category of performance or communication. If the client comment on performance is validated, then the category is 'performance' and the translator 190 generates the recommended action or task to meet with the client and portfolio manager to adjust the portfolio. If the client comment on performance is not validated, then the category is 'communication' and the translator 190 generates the recommended action or task to meet with the client to explain that the performance is reasonable with the benchmark.

As an illustrative example, the system 100 can receive input data indicating that the client changes his address in a system. The data adapter 170 receives the input data in the raw format from the data source 160 and collects the information change from the system. The intent/concern engine 180 classifies the data by comparing the previous address information for the client and determines the address change. The intent/concern engine 180 computes the intent as 'life event'. The translator 190 uses different rules to generate the recommended action or task, such as determining if the address change triggers any new tax regulations. The system 100 determines an advisor category for the input data and event. If the address change triggers new tax regulations, then the category is 'financial plan' and the translator 190 generates the recommended action or task for advisor to adjust the financial plan as per the new regulation and communicate with the client on how to avoid or minimize additional tax payments. If the address change does not trigger new tax regulations, then the translator 190 generates the recommended action or task to take no action. The translator 190 uses different rules to generate the recommended action or task, such as determining if the address change indicates that the client purchased a new home. If the address change indicates that the client purchased a new home, then the category is 'opportunity' and the translator 190 generates the recommended action or task to offer the client a mortgage.

As an illustrative example, the system 100 can receive input data indicating client comments on a document to complain about a service or product. The data adapter 170 receives the input data in the format from the data source 160, collates comments, extracts text from the comments, and removes unnecessary text. The intent/concern engine 180 classifies the data by categorizing and aggregating the text. The intent/concern engine 180 computes the intent as 'technology'. The translator 190 uses different rules to generate the recommended action or task, such as determining if the complaint topic has exceeded a threshold number of complaints (e.g. three). The system 100 determines an advisor category for the input data and event, such as service improvement or communication. If the complaint topic has exceeded the threshold number of complaints, then the category is 'service improvement' and the translator 190 generates the recommended action or task to communicate with the client and connect with the relevant department to address the complaint. If not, then the category is 'communication' and the translator 190 generates the recommended action or task to communicate with the client to advise that the complaint has been received and recorded.

As an illustrative example, the system 100 can receive input data from a financial planning tool that detects no life insurance. The data adapter 170 receives the input data in the raw format from the data source 160, cleans and collates data, and removes unnecessary text. The intent/concern engine 180 classifies the data by categorizing the detection and changes. The intent/concern engine 180 computes the intent as 'life event'. The translator 190 uses different rules to generate the recommended action or task, such as determining if the client is the correct age for life insurance. The system 100 determines an advisor category for the input data and event, such as risk or opportunity. If the client is the correct age for life insurance, then the category is 'risk' and 'opportunity'. The translator 190 generates the recommended action or task to communicate with the client to recommend insurance products and add the risk to the financial plan. If not, then the translator 190 generates a recommendation to take no action.

As an illustrative example, the system 100 can receive input data from a financial tool that new transactions will make a client account have a negative balance. The data adapter 170 receives the input data in the format from the data source 160, cleans and collates data, and removes unnecessary text. The intent/concern engine 180 classifies the data by categorizing the detection and changes. The intent/concern engine 180 computes the intent as a 'portfolio event'. The translator 190 uses different rules to generate the recommended action or task, such as determining if the new transaction puts the client account within 10% of a threshold. The system 100 determines an advisor category for the input data and event, such as 'risk' or 'no action'. If the new transaction puts the client account within 10% of the threshold, then the category is 'risk' and the translator 190 generates the recommended action or task to communicate with the client to add new funds or liquidate a position. If not, then the translator 190 generates the recommended action or task to take no action.

Figure 9:
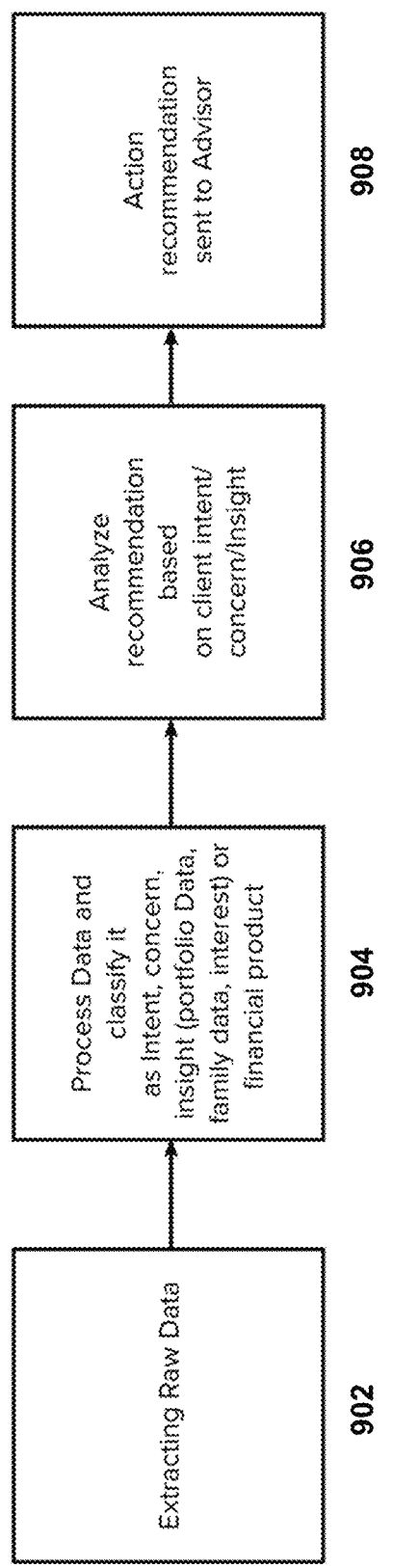
FIG. 9 shows an example flow diagram of a process for action recommendations.

FIG. 9 shows an example flow diagram of a process 900 for action recommendations. At 902, the system 100 extracts raw data from different data sources 160. The system 100 receives information from multiple data sources in raw format.

At 904, the system 100 processes the data to clean and transform the data, and the system 100 classifies the data as an intent, concern or insight. Examples of classifying the data include classification as a portfolio data, family data, and market data. The system 100 can also classify the data as relating to a financial product. All new data for the event gets processed to determine one or more types of intents or concerns. Example types of intents or concerns include family addition, alternative energy, fees, market movement, market segment, portfolio event, client action, regulatory change, life event, performance, and technology.

At 906, the system 100 generates a recommendation (task or action) based on the intent, concern or insight. The system 100 can use rules to generate the recommended action or task. The rules can be based on the type of intent or concern. The rules can have different categories to define different types of actions or tasks. Example categories include financial plan, opportunity, communication, risk, trade, education, advisor action, no action. At 908, the system 100 transmits the recommended task or action to an advisor interface 130.

Figure 10:
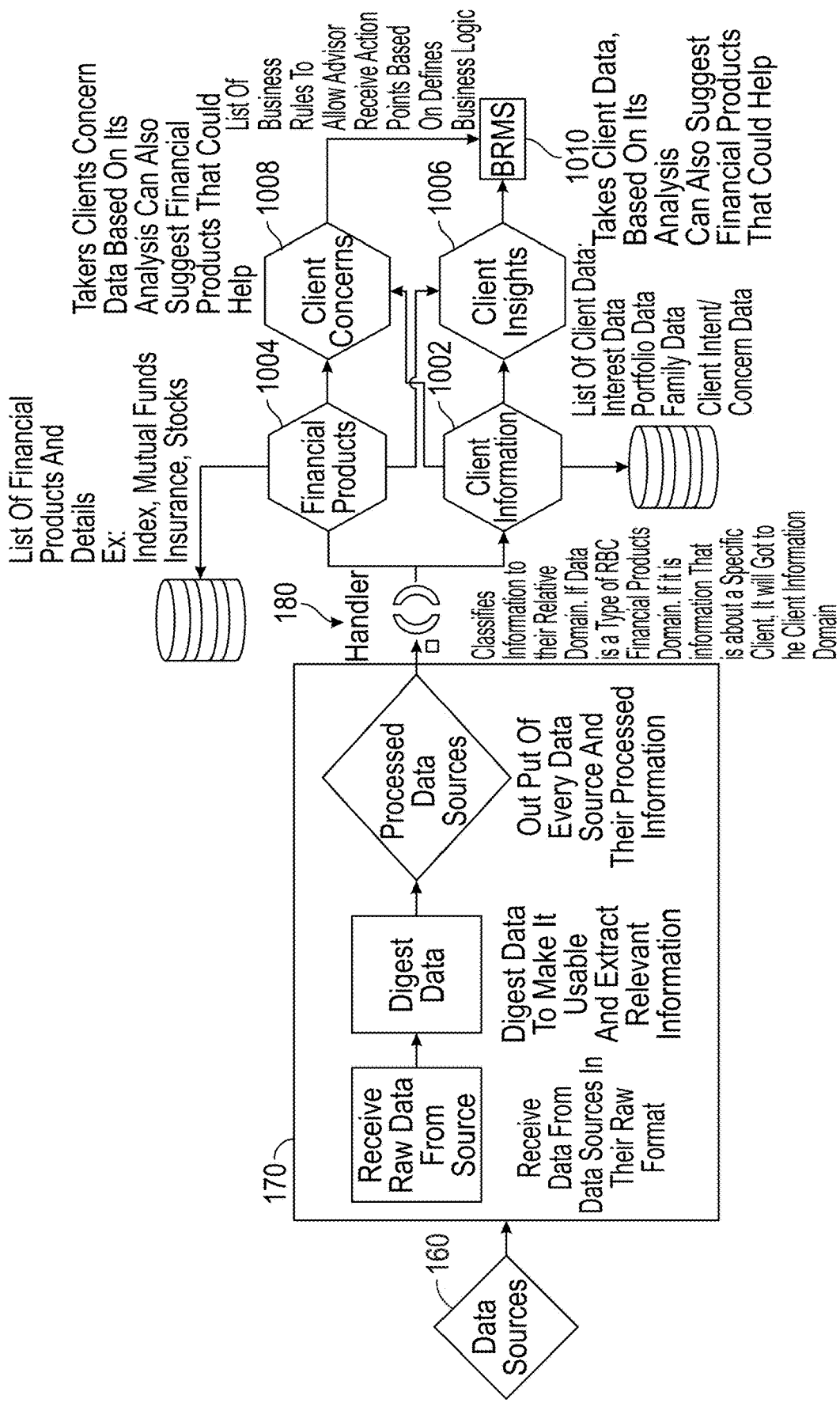
FIG. 10 shows an example diagram of a system in accordance with an embodiment.

FIG. 10 shows an example diagram of aspects of the system 100 in accordance with an embodiment.

In some example embodiments, the system 100 uses a domain driven architecture with a client domain 1002, a financial product domain 1004, a client insight domain 1006 and a client concern domain 1008.

The data adapter 170 receives data in different formats from different data sources 160 in their raw data formats. The data adapter 170 receives raw data from a data source 160 and digests the data. The data adapter 170 digests the data to make it usable and extracts relevant information. The data adapter 170 outputs processed data sources. The data adapter 170 provides processed information from all data sources 160. In the example embodiment, the intent/concern engine 180 has a handler to classify processed data into domains for storage in servers of the different domains. If the data is a type of financial product then the handler transmits the data to the financial product domain 1004. If the data is about a specific client then the handler transmits the data to the client information domain 1002.

In some embodiments, the financial product domain 1004 stores financial product data. In some embodiments, the client information domain 1002 stores interest data, portfolio data, client intent data, client concern data, and family data. In some embodiments, the client insight domain 1006 stores client interest data received from the client domain 1002 and financial product data received from the financial product domain 1004, and generates events populated with data from the client interest data and the financial product for the business rule management system 1010. In some embodiments, the client concern domain 1008 stores client concern data received from the client domain 1002 and client identifiers, and generates events populated with data from the client concern data and the client identifiers for the business rule management system 1010.

The client information domain 1002 stores different types of client data received from the handler. The financial product domain 1004 stores different types of financial data received from the handler. The client concern domain 1008 combines data from the financial product domain 1004 and the client information domain 1002 to populate events for the business rule management system 1010. The client insight domain 1006 combines data from the financial product domain 1004 and the client information domain 1002 to populate events for the business rule management system 1010.

The financial product domain 1004 has a repository with a list of different financial products and data for the financial products. The financial product domain 1004 can send data to a client concern domain 1008 or a client insight domain 1006. The client information domain 1002 has a list of client data such as interest data, portfolio data, family data, and client intent or concern data. The client information domain 1002 can send data to a client concern domain 1008 or a client insight domain 1006.

The client concern domain 1008 processes client concern data to suggest or recommend financial products for the concern. The client insight domain 1006 processes client data to suggest or recommend financial products. The client concern domain 1008 and a client insight domain 1006 provide output to a business rule system 1010 to generate output for an advisor interface 130, such as recommended actions or tasks. The business rule system 1010 has a list of business rules that an advisor interface 130 can select to generate insight data about clients.

Figure 11A:
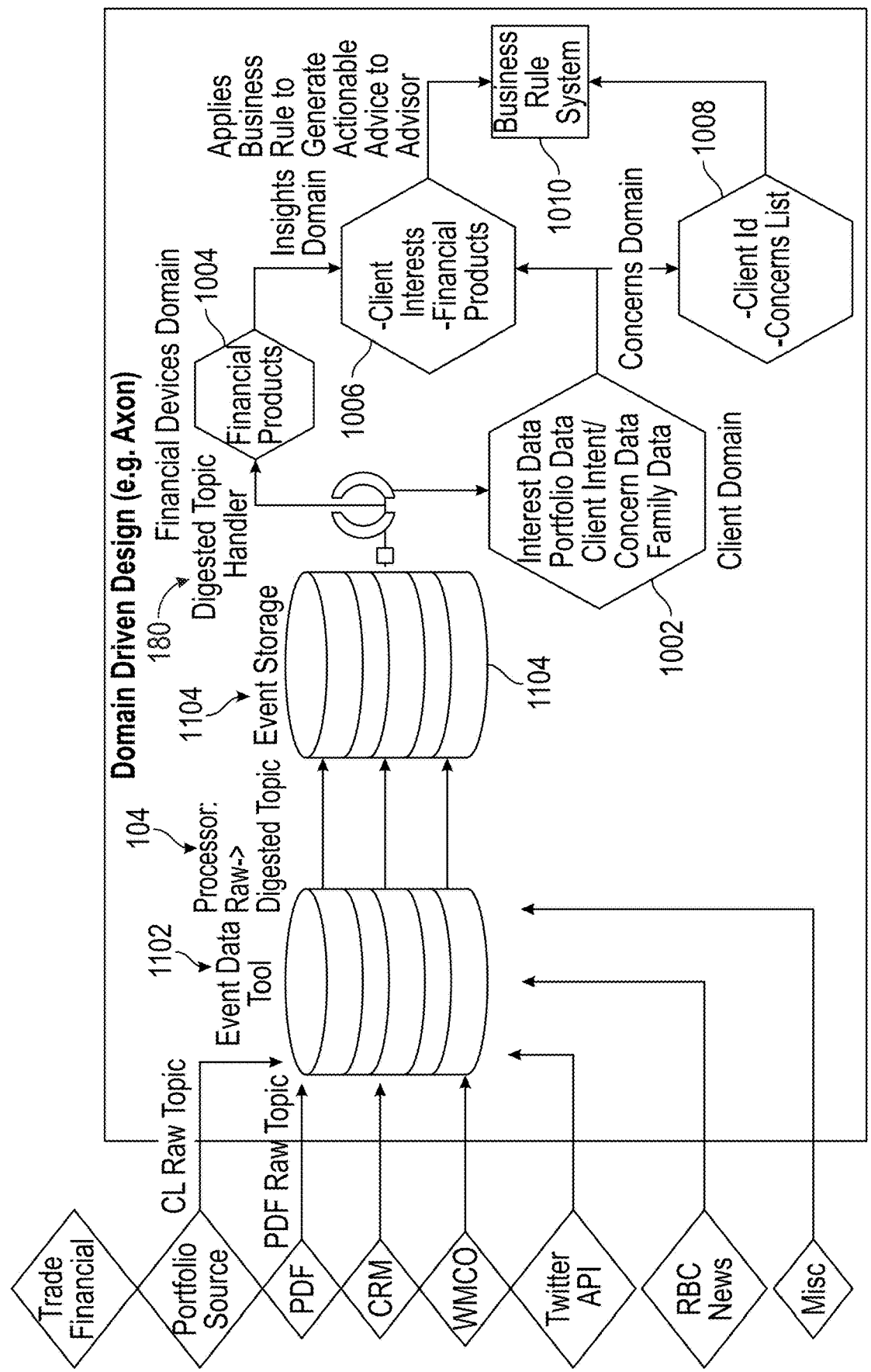
FIG. 11A shows an example diagram of a system in accordance with an embodiment.
Figure 11B:
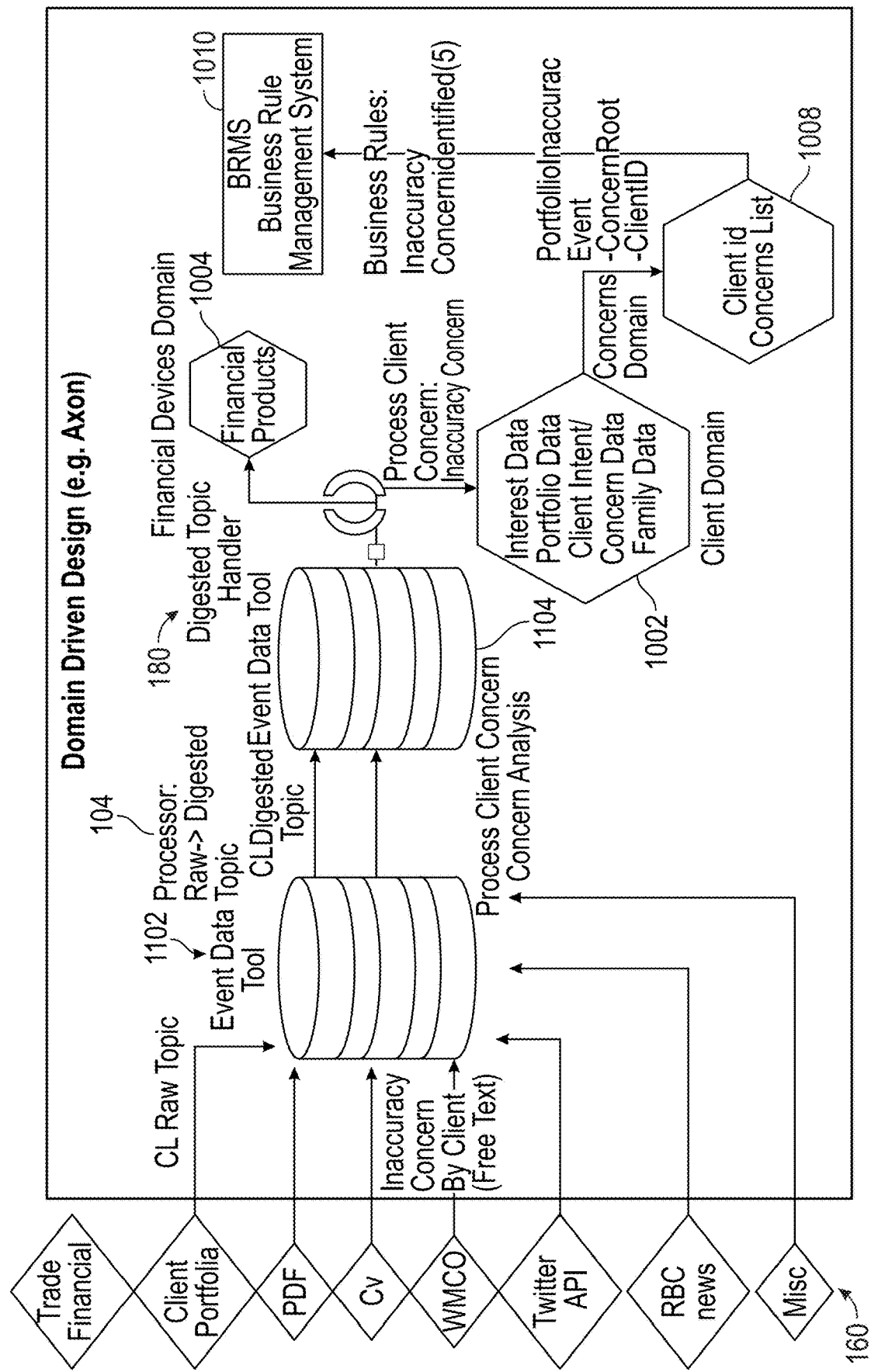
FIG. 11B shows an example diagram of a system and data flow.

FIG. 11A shows an example diagram of aspects of the system 100 in accordance with an embodiment. In this example, the system 100 has a domain-driven design. An event data tool 1102 receives data in different formats from different data sources 160 in their raw data formats, and digests or extracts the data. The processor 104 transforms the raw data into digested topics and stores the digested topics in event storage 1104. The digested topic makes data usable and extracts relevant information. For example, the processor 104 can receive input from direct identification of key words and phrases. The processor 104 can detect that a user reads more than a number of articles and flag a concern.

The processor 104 can process data differently, depending on the data source or place of origin. For example, if data comes from a financial purchasing tool, then the data will be processed as a financial product event. As another example, if the data comes from a portfolio source, then the data will be processed as a client portfolio data update. The processor 104 can determine what actionable item the client is requesting by processing input data. The processor 104 can collect several such requests or concerns and once multiple concerns are collected, then the processor 104 will generate and send a concern event. The news data can be processed as information about articles the client has been reading (e.g. via a document management system). The processor 104 can detect multiple news updates and process the news data as a client news interest event. The processor 104 can analyze information from social media to classify the input data as either interest, or family data.

In the example embodiment, the intent/concern engine 180 has a digested topic handler to classify processed data into domains using commands. If the data is a type of financial product then the handler transmits the data to the financial product domain 1004 which stores financial products. If the data is about a specific client then the handler transmits the data to the client information domain 1002 which stores interest data, portfolio data, client intent data, client concern data, and family data.

The financial product domain 1004 can send data to a client insight domain 1006. The client insight domain 1006 processes client data to generate actionable insights, or recommended actions or tasks for an advisor interface. The client insight domain 1006 stores client interests and financial products. The client information domain 1002 can send data to a client concern domain 1008 or a client insight domain 1006. The client concern domain 1008 stores client identifiers and lists of concerns. The client concern domain 1008 processes client concern data to suggest or recommend financial products for the concern. The client concern domain 1008 and the client insight domain 1006 provide output to the business rule management system 1010. The business rule system 1010 generates output for an advisor interface 130, such as recommended actions or tasks. The business rule system 1010 has a list of business rules that an advisor interface 130 can select to generate insight data about clients.

FIG. 11A shows an illustrative example. The event data tool 1102 can receive raw topic input data from a client portfolio. The processor 104 can transform the raw topic data into a client digested topic for storage in the event store 1104. The raw topic can be received in the raw format from the client portfolio data source. The digested topic can be extracted information from the raw topic data (cleaned, normalized, standardized, etc.). The raw topic data can be free text, and the digested topic data can be a vector format of extracted keywords, for example.

The event data tool 1102 can receive a document comment indicating that there is a portfolio inaccuracy. The event data tool 1102 can generate a concern event in response to receiving input data from different data sources indicating client concerns. There can be input data for concerns received from two different data sources, For example, the event data tool 1102 can also receive free text data indicating an inaccuracy concern by the client. The event data tool 1102 can generate another concern event. The processor 104 can process the raw input data to categorize the raw data as a concern. The processor 104 can process client data using a concern analysis to generate concern events. The concern data is saved as event data in event storage 1104. The handler provides the concern data to the client information domain 1002 for storage as client intent/concern data. The client information domain 1002 saves the concern events, and the processed data for the different client concerns.

The intent/concern engine 180 has a handler to process the concern events to classify the input data as an inaccuracy concern event. After a threshold number of concern events are received by the event storage 1104, the processor 104 and handler can classify the concern type and initiate the data flow to trigger the business rule management system 1010. In this example, the processor 104 can classify the type of concern as an inaccuracy concern. The handler can process the inaccuracy concern data to trigger generation of recommendations by the business rule management system 1010. The handler can trigger action by the business rule management system 1010 using the client concern domain 1008 data for the portfolio inaccuracy event. The handler routes the data to the client information domain 1002 for storage in server as client intent/concern data. The client information domain 1002 provides the client intent/concern data to the client concerns domain 1008 to populate a portfolio inaccuracy event. The client concern domain 1008 can store the data as a portfolio inaccuracy concern event with a concern root and a client identifier. The client concern domain 1008 combines the portfolio data and concern data from the client information domain 1002 to populate the portfolio inaccuracy event. The client concern domain 1008 provides the data to the business rule management system 1010 to trigger recommended actions or tasks. The business rule management system 1010 generates output indicating the inaccuracy concerns identified, and recommended actions or tasks.

In this example, the event data tool 1102 receives concern events from two different data sources 160 in different formats and times. The concern data is being received in raw format from the document comment, and the concern data is also received in free text format. The concern data received in free text format can be processed by a handler or an intention application programming interface (API) to determine an intent or action of the client. As the processor 104 detects multiple events (two events in this example), the processor 104 then generates a processed concern event and sends the processed concern event to the handler which sends the concern event to the client information domain 1002 for storage. From the client information domain 1002, the concern event is sent to the client concern domain 1008. Since the concern event is portfolio-related, the system 100 will consider portfolio data from the client information domain 1002 to get further data or information. The system 100 can generate a recommended action to the advisor interface 130, such as a message or notification about the portfolio concern and details about the portfolio.

The client concern domain 1008 combines data and events received from the client information domain 1002. The client concern domain 1008 generates new events (e.g. portfolio inaccuracy event) populated with the combined data, which are sent to the business rule management system 1010 to trigger recommended actions and tasks. In this example, the business rule management system 1010 receives data transformed from the raw data initially received from the different data sources 160.

Figure 11C:
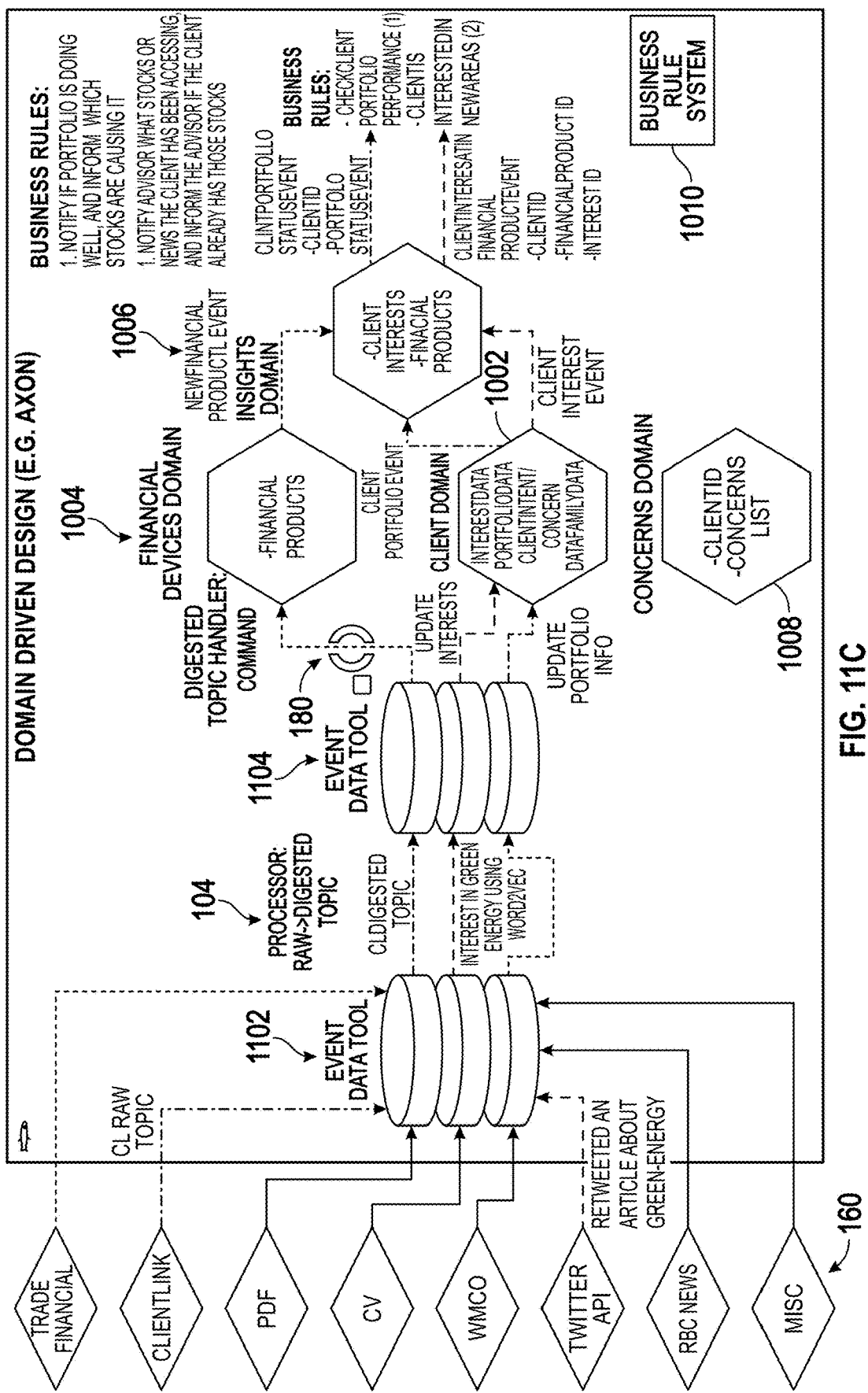
FIG. 11C shows another example diagram of a system and data flow.

FIG. 11C shows another illustrative example. In this example, a data source 160 can be a social media data source that provides input data indicating that the client shared an article about green energy. The processor 104 implements data normalization and standardization. The processor 104 transforms the text input data on green energy into a standard vector format indicating an interest in green energy. Another data source 160 is a client record that provides input data for a client raw topic. The processor 104 transforms the client raw topic into a client digested topic by extracting relevant data elements. A further data source 160 is a trade financial system that provides input data for a financial product. The processor 104 transforms the raw data on the financial product into a financial event. The event data tool 1102 receives raw data from different data sources. The raw data is transformed by processor 104 and stored in event data storage 1104.

The handler (digested topic handler) sends the financial event data to the financial domain 1004 for storage as financial product data. The financial product domain 1004 generates a new financial product event for the client insight domain 1006 which is populated with the financial product data.

The handler sends the client digested topic data to the client information domain 1002 for storage as portfolio data. The client domain sends a client portfolio event to the client insight domain 1006 with the portfolio data. The client insight domain 1006 sends a client portfolio status event populated with data for a client identifier and a portfolio status event to the business rules management system 1010. The business rules management system 1010 uses rules to initiate actions such as a check client portfolio performance rule. The business rules management system 1010 can generate a recommended action or task for the advisor interface 130 to notify if the portfolio is not doing well, and inform which financial products are causing the poor performance.

The handler sends the data indicating an interest for green energy to the client information domain 1002. The client information domain 1002 stores the data as interest data. The client information domain 1002 sends a client interest event (populated with the data for the interest in green energy) to the client insight domain 1006. The client insight domain 1006 generates a client interest in a financial product event populated with data for a client identifier, a financial product identifier, and an interest identifier, and sends the event to the business rules management system 1010. The business rules management system 1010 has rules for client interests, such as a client interest in a new area rule. The business rules management system 1010 can generate a recommended action or task for the advisor interface to notify what news or financial products the client has been accessing and whether the client already has the financial products in the client portfolio. The business rule management system 1010 has rules to notify the client if the portfolio is not doing well and inform which financial products are causing the poor performance, and rules to notify the advisor what stores or news the client has been accessing, and inform the advisor if the client already has those stocks.

The client insight domain 1006 combines data and events received from the financial product domain 1004 and the client information domain 1002. The client insight domain 1006 generates new events populated with the combined data, which are sent to the business rule management system 1010 to trigger recommended actions and tasks. In this example, the business rule management system 1010 receives data transformed from the raw data initially received from the different data sources 160.

The system 100 can generate and manage different types of events. For example, events can relate to poor portfolio performance. The system can have definitions for different types of poor portfolio performance events. A definition can be a portfolio that has been losing 20% of money over 2 months. Another definition can be a portfolio not making more than the expected interest for a quarter.

As another example, events can relate to financial product interest. An event can be generated when a client has been reading a document or news about a stock or financial product. Another event can be generated when a client has been posting on social media about some stock or public company.

As another example, events can relate to suspicious movement. For example, an event can be generated when a client has a lot of account movement in or out of accounts more than normal within certain time period.

As a further example, events can relate to notifications. A combination of data that triggers an event. The notification can be in the form of email to the advisor interface 130.

Events can also relate to insights. Example insights can tell the advisor to book an appointment with the client to discuss financial interests and portfolio performance, to suggest portfolio changes, to get more information from the client, and suggest a new financial product.

Figure 12:
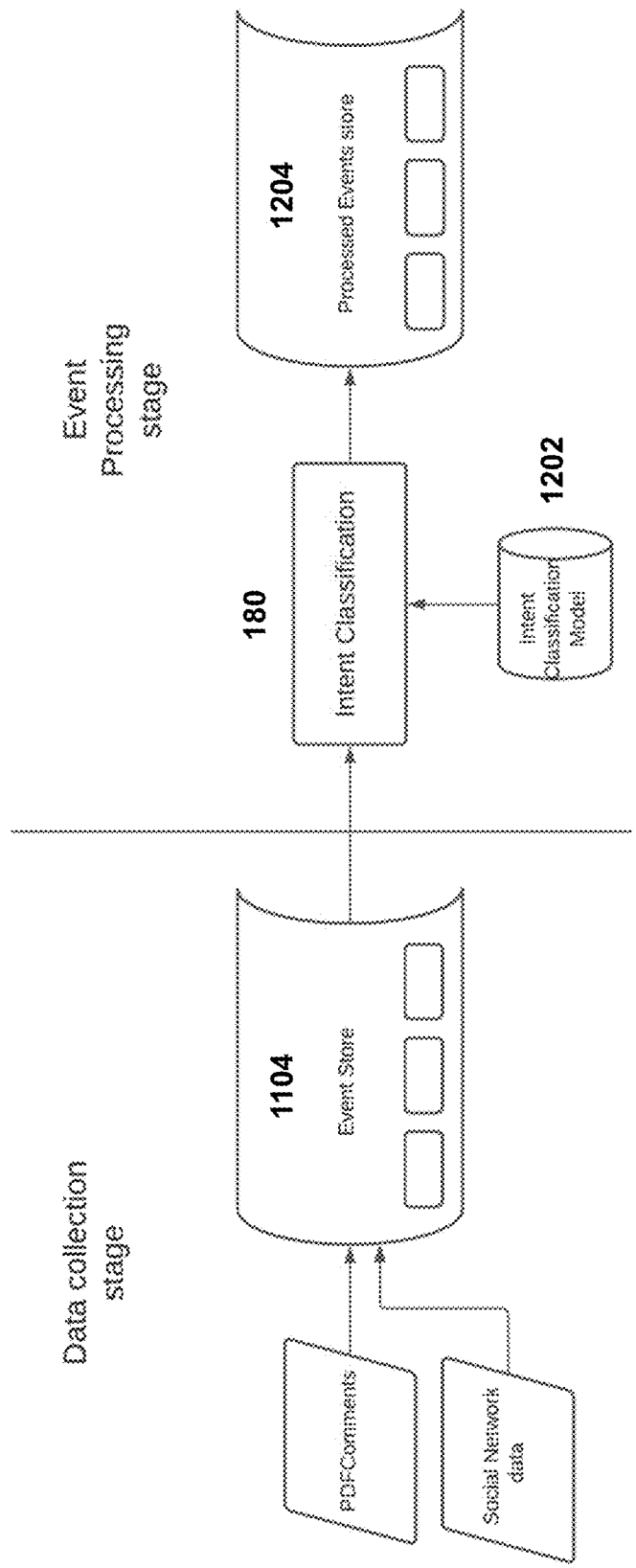
FIG. 12 shows an example diagram of aspects of the system in accordance with an embodiment.

FIG. 12 shows an example diagram of aspects of the system 100 in accordance with an embodiment. In this example, the system 100 has a data collection stage and an event processing stage.

For the data collection stage, the system 100 processes document comments and social network data to generate events and stores the events in the event store 1104. The system 100 cleans the input data before storage in event store 1104. For example, documents comments can be input data to event store for storage.

For the event processing stage, the system 100 classifies the data in the event store using an intent classification model 1202 to output interests, concerns, or insights to the processed events store 1204 for storage. The system 100 runs classification on the data using the intent classification model 1202.

Figure 13:
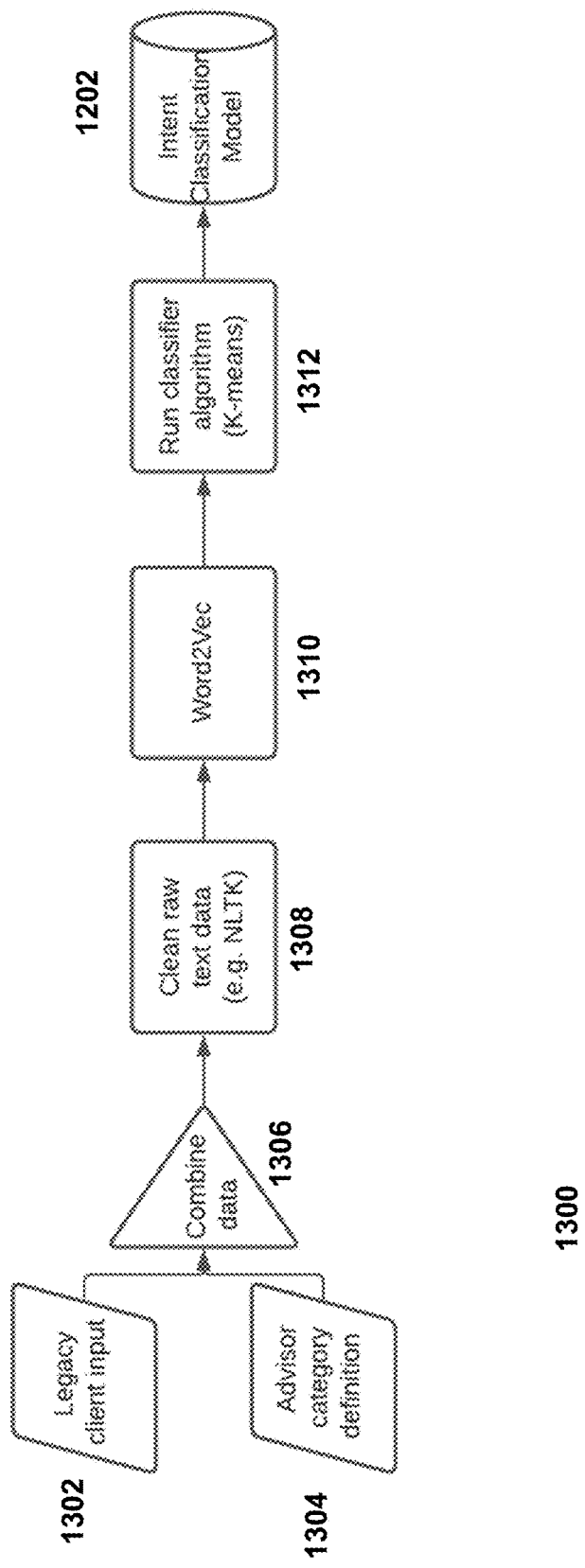
FIG. 13 shows an example diagram for a classification model.

FIG. 13 shows an example diagram of process 1300 for building an intent classification model 1202 in accordance with an embodiment. At 1302, the system 100 accesses legacy client input. At 1304, the system 100 accesses advisor category definitions. The system 100 can configure different advisor category definitions. For example, advisor category definitions can include financial advice, performance concerns, family, goals for financial plan, fees, and help. The input data can have a keyword 'grandchild' and the system 100 can process the input data to assign the family category of the advisor category definitions. As another example, the input text can include green energy and the system 100 can assign a financial education category. The system 100 classifies or categorizes client intents based on advisor category definitions.

At 1306, the system combines the legacy client input and data from the advisor category definitions to generate input data for building the classification model 1202.

At 1308, the system 100 cleans raw text data. The system 100 can use natural language processing (NLP) as part of the data normalization process to clean the data and remove terms. An example NLP component is a natural language toolkit (NLTK). The system 100 can use the NLTK to clean data of unnecessary terms. At 1310, the system 100 transforms the data into a standard format to represent the data for the model 1202. The system 100 implements data standardization to transform data into standard formats or representations. For example, the system 100 translates text input data into Word2Vec (vector format) for data standardization.

At 1312, the system 100 creates a training model by running a classifier to classify existing text data with assigned intents. For example, the system can use K-means on the training model where k is the data from the advisor category definitions. The system 100 uses the training model to build the intent classification model 1202 for use by the intent/concern engine 180. For example, the input data text can contain the word 'grandchild' which the system 100 assigns to the family category of advisor category definitions. The system 100 can classify data indicating that the grandchild is born as a concern. The system 100 can send feedback requests to the advisor interface 130 and receives advisor feedback during the classification process to update the training model. The process 1300 is a training mode of system 100 to train and update the intent classification model 1202.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the description, the reference to system can include processors, memories, servers, services, interfaces, portals, systems, or other systems formed from computing devices. It should be appreciated that the use of such terms is deemed to represent one or more computing devices having at least one processor configured to execute software instructions stored on a computer-readable, tangible, non-transitory medium. A server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implementing the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Throughout the foregoing discussion, numerous references will be made regarding servers, services, interfaces, portals, systems, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. For instance, the types of interaction that are tracked by the system 100 may include numerous types of interactions not enumerated herein and the information and tasks generated by the analytics tool 124 and task generation tool 126 will depend on numerous factors including previous client interactions. The scope is indicated by the appended claims.

What is claimed is:

1. A system for processing electronic interactions and recommending actions for an advisor interface, the system comprising:
 data adapters to extract client-specific data received from different data sources in different raw formats, the client-specific data comprising electronic interactions with at least one document from a document communication system, client electronic actions, news, client portfolio data, and market data;
 non-transitory memory storing the client-specific data and a classification model;
  at least one processor executing computer readable instructions stored in the memory to:
  process the client-specific data to classify the client-specific data as one or more of an intent, concern, or insight classification for a client using the classification model stored in the memory, wherein the classification model receives the client-specific data as input and generates the one or more of the intent, concern, or insight classification for the client based on the client-specific data and a plurality of advisor category definitions, and wherein a handler routes the client-specific data to a client domain server and data about one or more types of financial products to a financial product domain server;
  determine or generate action or task recommendation based on the one or more of the intent, concern, or insight classification for the client using a business rule management system;
  transmit the action or task recommendation to the advisor interface.

2. The system of claim 1 wherein the financial product domain server stores financial product data.

3. The system of claim 1 wherein the client domain server stores interest data, portfolio data, client intent data, client concern data, and family data.

4. The system of claim 1 wherein a client insight domain server stores client interest data received from the client domain server and financial product data received from the financial product domain server, and generates events populated with data from the client interest data and the financial product for a business rule management system.

5. The system of claim 1 wherein a client concern domain server stores client concern data received from the client domain server and client identifiers, and generates events populated with data from the client concern data and the client identifiers for a business rule management system.

6. The system of claim 1 wherein the data adapters implement data standardization and data normalization on the client-specific data to clean data from the different raw formats and convert data into a common format.

7. The system of claim 1 wherein the data adapters have an event data tool to transform raw data into events and store the events in an event data storage.

8. The system of claim 1 wherein the classification model uses key word searching, natural language processing, and machine learning to classify the client-specific data.

9. The system of claim 1 wherein the processor builds the classification model using training data, the plurality of advisor category definitions, and feedback from the advisor interface, wherein the processor cleans the training data, converts the training data into standardized form, and creates a training model.

10. The system of claim 1 wherein the processor uses a translator to generate the action or task recommendation from the one or more of the intent, concern, or insight classification for the client.

11. The system of claim 1 wherein the action or task recommendation comprises automated comments for the advisor interface.

12. The system of claim 1 wherein a type of interaction captured is a period of time first user spends with the document open.

13. The system of claim 1 wherein a type of interaction captured is a period of time the user spends on a portion of the document.

14. The system of claim 1 wherein a type of interaction captured is a number of visits by the user to the document.

15. The system of claim 1 wherein a type of interaction captured is the date the document is accessed by the user.

16. The system of claim 1 wherein a type of interaction captured is a period of time the document is accessed by the user.

17. The system of claim 1 wherein a type of interaction captured is a number of annotations to the document by the user.

18. The system of claim 1 further comprising the processor configured to receive additional data regarding the user from a user database or data source.

19. The system of claim 18 further comprising the processor configured to generate a task for another user based on the additional data.

20. The system of claim 18 further comprising the processor configured to generate a task for another user based on the additional data and the first user's interaction with the document.

21. A process for virtual document interaction between at least two users comprising:
 at a hardware processor,
  extracting client-specific data from different data sources in different raw formats, the client-specific data comprising electronic interactions with at least one document from a document communication system, client electronic actions, news, client portfolio data, and market data;
  storing the client-specific data and a classification model at a non-transitory memory;
  processing the client-specific data to classify the client-specific data as one or more of an intent, concern, or insight classification for a client using the classification model stored in the memory, wherein the classification model receives the client-specific data as input and generates the one or more of the intent, concern, or insight classification for the client based on the client-specific data and a plurality of advisor category definitions, and wherein a handler routes the client-specific data to a client domain server and data about one or more types of financial products to a financial product domain server;
  routing the client-specific data to the client domain server and the data about one or more types of financial products to the financial product domain server for event generation;

determining or generating a recommended action or task based on the one or more of the intent, concern, or insight classification for the client using a business rule management system; and transmitting the action or task recommendation to the advisor interface.

\* \* \* \* \*